US010803705B2

(12) United States Patent
Newton et al.

(10) Patent No.: US 10,803,705 B2
(45) Date of Patent: Oct. 13, 2020

(54) SYSTEMS AND METHODS FOR DYNAMIC WAGERING

(71) Applicant: Roxor Gaming Limited, London (GB)

(72) Inventors: Thomas Newton, London (GB); Davinder Pal Singh Pank, London (GB)

(73) Assignee: Roxor Gaming, Ltd., London (GB)

( * ) Notice: Subject to any disclaimer, the term of this patent is extended or adjusted under 35 U.S.C. 154(b) by 774 days.

(21) Appl. No.: 14/559,911

(22) Filed: Dec. 3, 2014

(65) Prior Publication Data

US 2015/0126274 A1 May 7, 2015

Related U.S. Application Data

(63) Continuation of application No. PCT/IB2014/059741, filed on Mar. 14, 2014.

(60) Provisional application No. 61/785,975, filed on Mar. 14, 2013.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ...... *G07F 17/3244* (2013.01); *G07F 17/3211* (2013.01); *G07F 17/3288* (2013.01)

(58) Field of Classification Search

USPC ......... 463/10, 20, 22, 25, 39, 42, 26, 29, 31

See application file for complete search history.

(56) References Cited

U.S. PATENT DOCUMENTS

| | | | | |
|---|---|---|---|---|
| 8,556,698 | B2 * | 10/2013 | Cockerille | G06F 8/68 273/138.1 |
| 2002/0073021 | A1 * | 6/2002 | Ginsberg | A63F 3/081 705/38 |
| 2007/0054732 | A1 | 3/2007 | Baerlocher | |
| 2009/0005173 | A1 * | 1/2009 | Bisson | G07F 17/3244 463/42 |
| 2009/0093300 | A1 * | 4/2009 | Lutnick et al. | A63F 9/24 463/26 |
| 2011/0086699 | A1 * | 4/2011 | Allen | G07F 17/32 463/25 |
| 2015/0126274 | A1 * | 5/2015 | Newton | G07F 17/3244 463/25 |

OTHER PUBLICATIONS

Written Opinion for PCT/IB2014/059741 dated Jul. 4, 2014; 4 pps.
International Search Report for PCT/IB2014/059741 dated Jul. 4, 2014; 3 pps.
International Report on Patentability for PCT/IB2014/059741 dated Sep. 15, 2015; 5 pps.

* cited by examiner

*Primary Examiner* — Adetokunbo O Torimiro
(74) *Attorney, Agent, or Firm* — Fincham Downs LLC; Carson C. K. Fincham

(57) ABSTRACT

Systems, methods, and articles of manufacture provide for dynamic wager sizes.

6 Claims, 11 Drawing Sheets

SYSTEMS AND METHODS FOR DYNAMIC WAGERING

CROSS-REFERENCE TO RELATED APPLICATIONS

The present application claims benefit and priority to, and is a continuation of, International Patent Application No. PCT/IB2014/059741 filed on Mar. 13, 2014 and published as WO 2014/141137 on Sep. 18, 2014, which itself claims benefit and priority to U.S. Provisional Patent Application No. 61/785,975 filed on Mar. 14, 2013 and titled "SYSTEMS AND METHODS FOR DYNAMIC WAGERING", the entirety of each such application being hereby incorporated by reference herein.

COPYRIGHT NOTICE

A portion of the disclosure of this patent document contains material that is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

Various wagering games such as slot-style games permit players to choose a number of paylines ("lines") and an amount to wager ("bet", "coin", or "wager") per payline. In non-slot-style games, there may not be multiple paylines, but the wager amount may still be chosen by the player. Often there are multiple wager size options and usually a "max bet" option is provided, that causes game play to proceed utilizing a maximum possible wager size (e.g., per payline in slot-style games). While players are typically presented with the option to either select a wager size from a predetermined set of available wager sizes, there is no option for the player to alter these options. Similarly, while the player may in some cases select or define their own wager size (e.g., using plus or minus increment buttons), there is a maximum bet size for any given wagering game.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Figure 1:
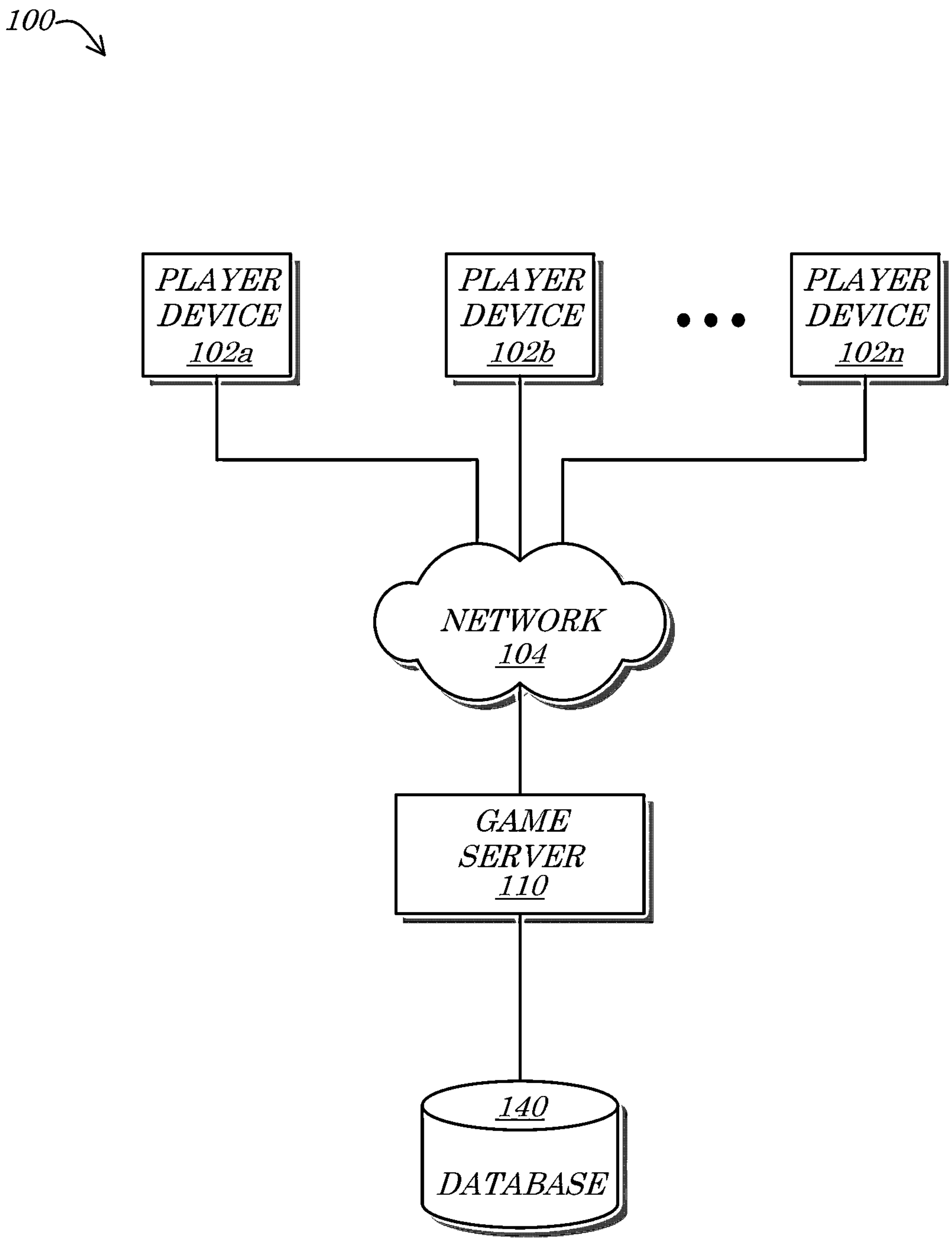
FIG. 1 is a block diagram of a system according to some embodiments.

Embodiments presented herein are descriptive of systems, apparatus, methods, and articles of manufacture for dynamic wager sizes. In some embodiments, a set of predetermined available wager sizes (and/or corresponding Graphical User Interface (GUI) elements) are selected, defined, calculated, and/or otherwise determined based upon characteristics and/or preferences of and/or associated with a player. A player's credit balance, account balance, coin-in, wager size selection history, demographics, and/or other player-related variables may be utilized, for example, to determine a set of wager size options (and/or the maximum wager size) available to the player (and/or available to the player in a specific game or game type).

In some embodiments herein, wager size options may be defined upon game initiation based on one or more player variables such as a player buy-in and/or deposit amount. According to some embodiments, wager size options may be defined in-game such as between game plays and/or game sessions based on player variables (e.g., credit balance, win/loss amounts, etc.). In such a manner, for example, a player that has deposited a large amount of credit for use in a game and/or that has just won a large amount of credits may not be restricted to wager size options that limit the player to wager levels that are below the player's appetitive.

While traditional wagering games (or social wager-style games) may have a max bet of five (5) credits, for example, in the case that the player has a credit balance of one hundred (100) credits, the max bet equates (at least initially) to a risk of five percent (5%) of the player's credit balance. If the player wagers five (5) credits on a max bet and wins nine hundred and five (905) credits, giving the player a total credit balance of one thousand (1,000), the traditional game only allows the player to risk one half of a percent (0.5%; max bet of five (5) credits divided by the credit balance of one thousand (1,000) credits) of the total credit balance. This max bet restriction of typical games, while certainly preventing the player from losing much of their credit balance per turn/game play, also severely limits the ability of the player to receive larger payouts. As payouts are a function of wager size, for example, the game never allows the player to receive a maximum payout greater than that available with the max bet of five (5) credits.

In contrast, embodiments herein modify the max bet and/or other wager size options based on player variables such as credit balance. In such a manner, for example, as the player's credit balance grows, so does the player's opportunity to achieve larger payouts. Different player variables and/or combinations of player or other variables may be utilized in some embodiments to define and/or modify wager size options for wagering and/or wager-style games, as described herein.

II. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined generally throughout the present description.

A "game", as the term is utilized herein (unless otherwise specified), may generally comprise any game (e.g., wagering or non-wagering, skill-based, chance-based, playable by hand (e.g., utilizing non-electric physical components, boards, and/or pieces), and/or electronically playable over a network) playable by one or more players in accordance with specified rules. An electronic game may be playable on a Personal Computer (PC), online in web browsers, on a game console, and/or on a mobile device such as a smartphone or tablet computer. "Gaming" thus generally refers to play of a game (e.g., by one or more players).

A "wager-style game", as the term is utilized herein (unless otherwise specified), generally refers to a game that is played in the same manner as a wagering game, but does not technically qualify as gambling. Casual and/or social network games may, for example, be conducted in the same manner of game play as a wagering game such as slots, but may not accept true wagers from players and/or may otherwise differ from true wagering games.

A "casual game", as the term is utilized herein (unless otherwise specified), may generally comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as utilized herein (unless otherwise specified), generally refers to a type of online game that is played through a social network, and in some embodiments may feature multiplayer and/or asynchronous game play mechanics. A "social network" may refer to an online service, online community, platform, and/or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a web browser and/or web-client game, a Flash®, or Java®-scripted game, and/or may be implemented on one or more mobile platforms such as on portable electronic devices.

A "wagering game", as the term is utilized herein (unless otherwise specified), may generally comprise a game in which a player can risk a wager or other consideration, such as, but not limited to: slot-style games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as utilized herein (unless otherwise specified), generally refers to an entity or system of components which provides games for play and facilitates play of such game by use of a network such as the Internet or a proprietary or closed networks (e.g., an intranet or local or wide area network). For example, a game provider may operate a website which provides games in a digital format over the Internet. In some embodiments in which a game comprising a wagering game is provided, a game provider may operate a gambling website over which wagers are accepted and results (e.g., winnings) of wagering games are provided.

As utilized herein, the term "player" may generally refer to any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As utilized herein, a "player device" is a subset of a "network device". The "network device", for example, may generally refer to any device that can communicate via a network, while the "player device" may comprise a network device that is owned and/or operated by or otherwise associated with a player (e.g., a network device specifically configured to permit use thereof by the player, such as by receiving login credentials from the player). Examples of player and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components. In some embodiments, a player device may comprise an electronic device configured to initiate, conduct, facilitate, and/or otherwise permit player participation in an electronic game.

As utilized herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As utilized herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As utilized herein, the terms “information” and “data” may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term “indication”, as utilized herein (unless otherwise specified), may generally refer to any indicia and/or other information indicative of or associated with a subject, item, entity, and/or other object and/or idea. As utilized herein, the phrases “information indicative of” and “indicia” may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A “session”, as the term is utilized herein (unless otherwise specified), may generally comprise a period of time spanning a plurality of event instances (e.g., with respect to a communication and/or game session) or turns of a game, the session having a defined start and defined end. An event instance or turn is triggered upon an initiation of, or request for, at least one result of the game by a player, such as an actuation of a “start” or “spin” mechanism, which initiation causes an outcome to be determined or generated (e.g., an RNG is contacted or communicated with to identify, generate or determine a random number to be used to determine an outcome for the event instance).

As utilized herein, the terms “outcome” and “result” should be differentiated in the present description in that an “outcome” is generally a representation of a “result”, typically comprising one or more game elements or game symbols. For example, in a “fruit themed” slot-style game, a winning outcome (i.e., an outcome corresponding to some kind of award, prize or payout) may comprise a combination of three “cherry” symbols. The “result” of this outcome may be a payout of X credits awarded to the player associated with the game. In another example, in a game in which a character moves along a game interface from a starting position to a finish position, an “outcome” of the game may comprise a symbol representing one or more movements along the interface and the “result” corresponding to this outcome may be the particular number and direction of the character’s movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible.

As utilized herein, the term “virtual currency” may generally refer to an in-game currency that may be utilized as part of a game or one or more games provided by a game provider as (i) currency for making wagers, and/or (ii) to purchase or access various in-game items, features or powers (e.g., “freemium” upgrades and/or options).

A “credit balance”, as the term is utilized herein (unless otherwise specified), may generally refer to (i) a balance of currency, whether virtual currency and/or real currency, usable for making wagers and/or purchases in a game and/or (ii) another tracking mechanism for tracking a player’s success or advancement in a game by deducting there from points or value for unsuccessful attempts at advancement and adding thereto points or value for successful attempts at advancement.

Some embodiments are descriptive of an “array” or “matrix” of symbols or game outcomes. As utilized herein, the terms “array” and “matrix” generally refer to a group of symbols, numbers, and/or expressions arranged in a plurality of rows and columns (or that can be readily and appropriately represented mathematically as being so arranged). In some embodiments, the term “array” is utilized to refer to a multi-dimensional matrix or combination of matrices while the term “matrix” is utilized to refer to a two-dimensional set of symbols or numbers (e.g., slot reel symbols and/or mathematical representations thereof). According to some embodiments, such as in the case that an array and/or matrix is populated with graphical game symbols, the array or matrix may be output and/or displayed (e.g., transmit to and/or rendered on a player device) as part of a game session.

III. Systems

Turning first to FIG. 1, a block diagram of a system 100 according to some embodiments is shown. In some embodiments, the system 100 may comprise a gaming platform such as a gaming platform via which one or more multiplayer and/or online games may be played (e.g., one or more games comprising dynamic wagering sizes as described herein). In some embodiments, the system 100 may comprise a plurality of player devices 102*a-n* in communication with and/or via a network 104. In some embodiments, a game server 110 may be in communication with the network 104 and/or one or more of the player devices 102*a-n*. In some embodiments, the game server 110 (and/or the player devices 102*a-n*) may be in communication with a database 140. The database 140 may store, for example, game date (e.g., processed and/or defined by the game server 110), data associated with players (not explicitly shown) owning and/or operating the player devices 102*a-n*, and/or instructions that cause various devices (e.g., the game server 110 and/or the player devices 102*a-n*) to operate in accordance with embodiments described herein.

According to some embodiments, any or all of the components 102*a-n*, 104, 110, 140 of the system 100 may be similar in configuration and/or functionality to any similarly named and/or numbered components described herein. Fewer or more components 102*a-n*, 104, 110, 140 (and/or portions thereof) and/or various configurations of the components 102*a-n*, 104, 110, 140 may be included in the system 100 without deviating from the scope of embodiments described herein. While multiple instances of some components 102*a-n* are depicted and while single instances of other components 104, 110, 140 are depicted, for example, any component 102*a-n*, 104, 110, 140 depicted in the system 100 may comprise a single device, a combination of devices and/or components 102*a-n*, 104, 110, 140, and/or a plurality of devices, as is or becomes desirable and/or practicable. Similarly, in some embodiments, one or more of the various components 102*a-n*, 104, 110, 140 may not be needed and/or desired in the system 100.

The player devices 102*a-n*, in some embodiments, may comprise any type or configuration of electronic, mobile electronic, and or other network and/or communication devices (or combinations thereof) that are or become known or practicable. A first player device 102*a* may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 102*a-n* may be specifically utilized and/or configured (e.g., via specially-programmed and/or stored instructions such as may define or comprise a software application) to communicate with the game server 110 (e.g., via the network 104).

The network 104 may, according to some embodiments, comprise a LAN, WAN, cellular telephone network, Bluetooth® network, NFC network, and/or RF network with communication links between the player devices 102*a-n*, the game server 110, and/or the database 140. In some embodiments, the network 104 may comprise direct communications links between any or all of the components 102*a-n*, 110, 140 of the system 100. The game server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second player device 102*b* may, for example, be connected to the game server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102*a-n*, 110, 140 of the system 100. The network 104 may comprise one or more cellular telephone networks with communication links between the player devices 102*a-n* and the game server 110, for example, and/or may comprise the Internet (and/or a portion thereof), with communication links between the player devices 102*a-n* and the database 140, for example.

According to some embodiments, the game server 110 may comprise a device (and/or system) owned and/or operated by or on behalf of or for the benefit of a game provider (not explicitly shown). The game provider may utilize player and/or game information or instructions (e.g., stored by the database 140), in some embodiments, to host, manage, analyze, design, define, price, conduct, and/or otherwise provide (or cause to be provided) one or more games such as online multiplayer games (e.g., one or more games comprising dynamic wagering sizes as described herein). In some embodiments, the game provider (and/or a third-party; not explicitly shown) may provide an interface (not shown in FIG. 1) to and/or via the player devices 102*a-n*. The interface may be configured, according to some embodiments, to allow and/or facilitate electronic game play by one or more players. In some embodiments, the system 100 (and/or interface provided by the game server 110) may present game data (e.g., from the database 140) in such a manner that allows players to participate in one or more online games (singularly, in/with groups, and/or otherwise). According to some embodiments, the game server 110 may cause and/or facilitate play of one or more games having dynamic wager sizes, as described herein.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102*a-n* may comprise the database 140 or a portion thereof, for example, and/or the game server 110 may comprise the database 140 or a portion thereof.

According to some embodiments, any or all of the player devices 102*a-n* in conjunction with one or more of the game server 110 and/or the database 140 (e.g., via the network 104) may conduct (in whole or in part), facilitate, and/or otherwise be associated with execution of one or more stored procedures, applications, processes, and/or methods (e.g., the method 600 of FIG. 6 herein, and/or one or more portions thereof) as described herein.

Figure 2:
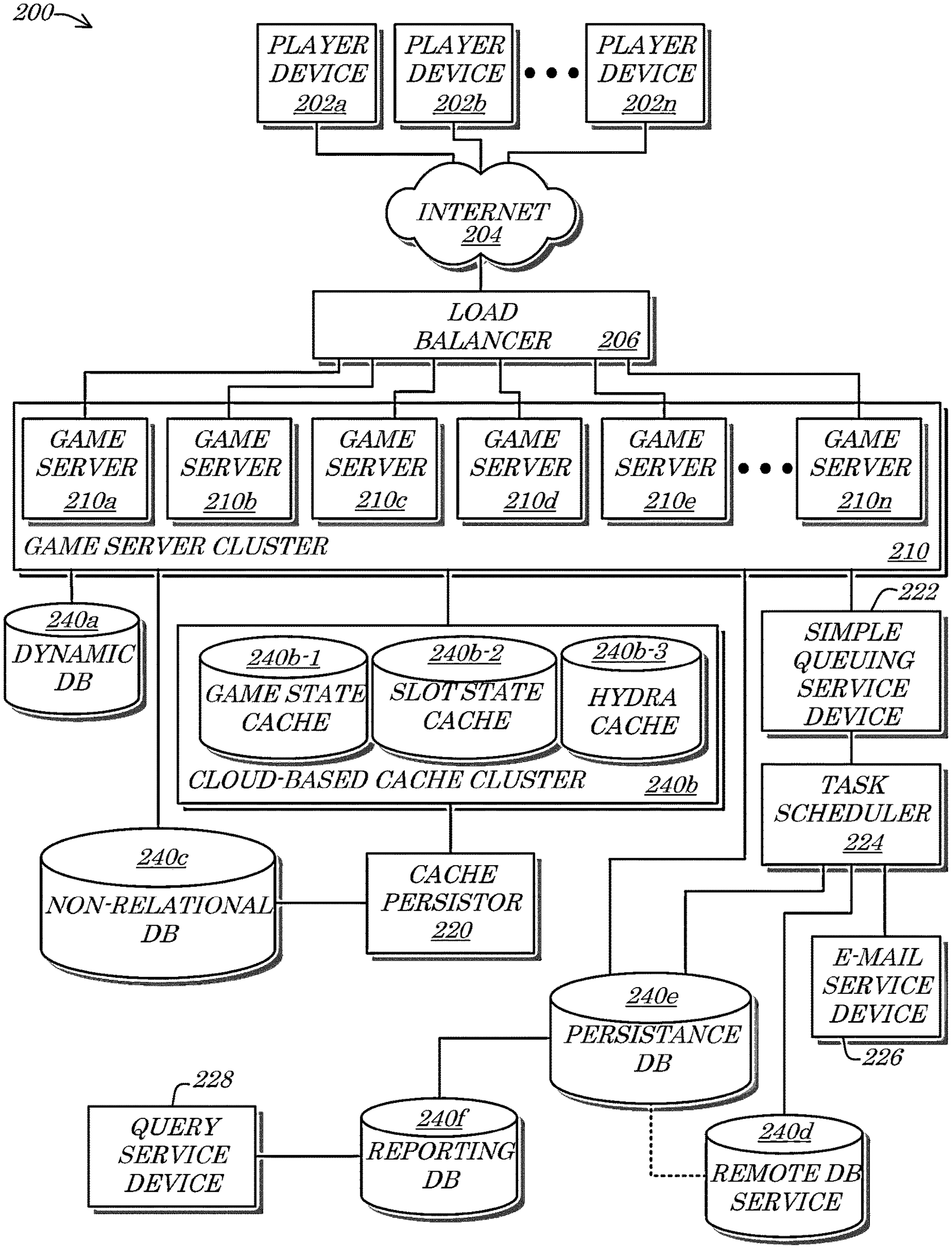
FIG. 2 is a block diagram of a system according to some embodiments.

Referring now to FIG. 2, a block diagram of a system 200 according to some embodiments is shown. In some embodiments, the system 200 may comprise a gaming platform such as a platform via which social, multiplayer, and/or online games may be played (e.g., one or more games comprising dynamic wagering sizes as described herein). In some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic DataBase (DB) 240*a*, a cloud-based cache cluster 240*b* (e.g., comprising a game state cache 240*b*-1, a bingo state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player devices 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slot-style games, poker, wagering games, wagering-style games, and/or other games of chance, skill, and/or combinations thereof. In some embodiments, the various game servers 210*a-n* (virtual and/or physical) of the game server cluster 210 may be configured to provide, manage, host, and/or conduct individual instances and/or sessions of available game types. A first game server 210*a*, for example, may host a first particular session of an online bingo-style game (or tournament), a second game server 210*c* may host a second particular session of an online bingo game (or tournament), a third game server 210*c* may facilitate an online poker tournament (e.g., and a corresponding plurality of game sessions that comprise the tournament), and/or a fourth game server 210*d* may provide an online slots game (e.g., by hosting one or more slot game sessions).

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer (not explicitly shown in FIG. 2). In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202*a-n* such as by utilizing a broadcaster device (also not separately shown in FIG. 2) that transmits the time-released game results to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DynamoDB™ service provided by Amazon® Web Services, LLC. The dynamic DB 240*a* may, for example, store information specific to one or more certain game types (e.g., wagering-style games) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1, for example, slot state (e.g., slot-style game specific state) data may be stored in the slot state cache 240*b*-2, and/or other game and/or player information (e.g., progressive data, referral data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistior 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

According to some embodiments, any or all of the player devices 202*a-n* in conjunction with one or more of the game servers 210*a-n* and/or the databases 240*a-f* (e.g., via the network 204) may conduct (in whole or in part), facilitate, and/or otherwise be associated with execution of one or more stored procedures, applications, processes, and/or methods (e.g., the method 600 of FIG. 6 herein, and/or one or more portions thereof) as described herein.

Figure 3:
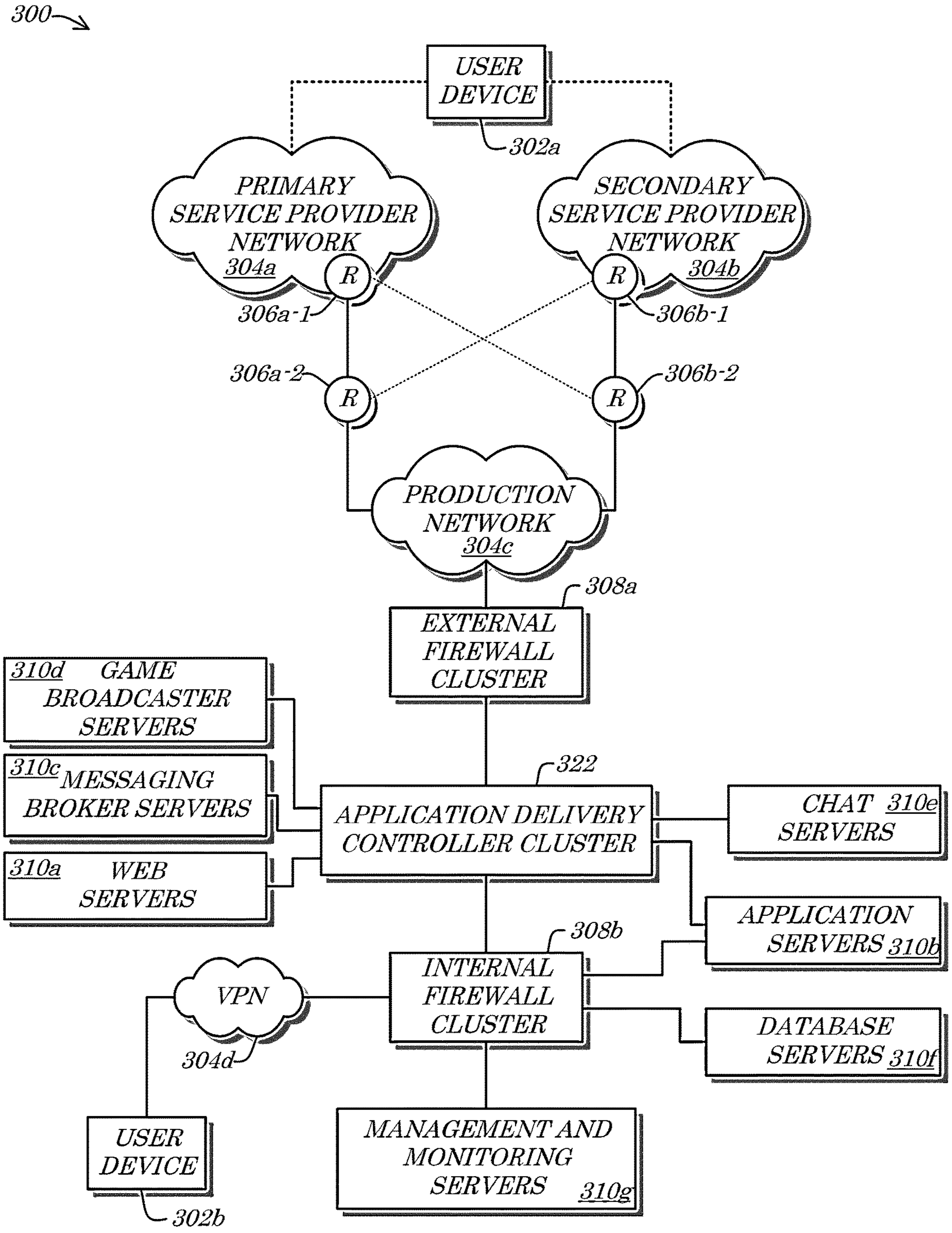
FIG. 3 is a block diagram of a system according to some embodiments.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played (e.g., one or more games comprising dynamic wagering sizes as described herein). In some embodiments, the system 300 may comprise a plurality of user devices 302*a-b*, a plurality of networks 304*a-b* (e.g., a primary service provider network 304*a*, a secondary service provider network 304*b*, a production network 304*c*, and/or a VPN 304*d*), a plurality of routers 306*a-b*, a plurality of firewall devices 308*a-b*, a plurality of game servers 310*a-g* (e.g., web servers 310*a*, application servers 310*b*, messaging broker servers 310*c*, game broadcaster servers 310*d*, chat servers 310*e*, database servers 310*f*, and/or management and monitoring servers 310*g*), and/or an application delivery controller cluster 322.

According to some embodiments, any or all of the components 302*a-b*, 304*a-b*, 306*a-b*, 308*a-b*, 310*a-g*, 322 of the system 300 may be similar in configuration and/or functionality to any similarly named and/or numbered components described herein. Fewer or more components 302*a-b*, 304*a-b*, 306*a-b*, 308*a-b*, 310*a-g*, 322 (and/or portions thereof) and/or various configurations of the components 302*a-b*, 304*a-b*, 306*a-b*, 308*a-b*, 310*a-g*, 322 may be included in the system 300 without deviating from the scope of embodiments described herein. While multiple instances of some components 302*a-b*, 304*a-b*, 306*a-b*, 308*a-b*, 310*a-g* are depicted and while single instances of other components 322 are depicted, for example, any component 302*a-b*, 304*a-b*, 306*a-b*, 308*a-b*, 310*a-g*, 322 depicted in the system 300 may comprise a single device, a combination of devices and/or components 302*a-b*, 304*a-b*, 306*a-b*, 308*a-b*, 310*a-g*, 322, and/or a plurality of devices, as is or becomes desirable and/or practicable. Similarly, in some embodiments, one or more of the various components 302*a-b*, 304*a-b*, 306*a-b*, 308*a-b*, 310*a-g*, 322 may not be needed and/or desired in the system 300.

In some embodiments, a first user device 302*a* may comprise an electronic device owned and/or operated by a player of an online game (not explicitly shown) and/or by an entity that otherwise accesses online game content and/or services externally (e.g., requiring external login and/or access credentials and/or procedures). The first user device 302*a* may, for example, be utilized to access content provided by and/or via the application delivery controller cluster 322. In some embodiments, the first user device 302*a* may interface with and/or connect to the production network 304*c* via the primary service provider network 304*a* and/or the secondary service provider network 304*b*. The primary service provider network 304*a* and the secondary service provider network 304*b* may, for example, load balance and/or provide redundant coverage for outage recovery by utilization of a first primary service provider network router 306*a*-1, a second primary service provider network router 306*a*-2, a first secondary service provider network router 306*b*-1, and/or a second secondary service provider network router 306*b*-2.

According to some embodiments, the application delivery controller cluster 322 may be insulated and/or protected from the production network 304*c* by an external firewall cluster 308*a*. The first user device 302*a* may, for example, be required to provide credentials to and/or otherwise access the application delivery controller cluster 322 via the external firewall cluster 308*a*.

In some embodiments, the application delivery controller cluster 322 may receive via and/or from the external firewall cluster 308*a* and/or the production network 304*c*, one or more requests, calls, transmissions, and/or commands from the first user device 302*a*. The first user device 302*a* may, for example, submit a call for an online gaming interface to the application delivery controller cluster 322. In some embodiments, the application delivery controller cluster 322 may comprise one or more hardware, software, and/or firmware devices and/or modules configured (e.g., specially-programmed) to route events and/or responses between the first user device 302*a* and one or more of the servers 310*a*-*g*. In the case that the first user device 302*a* is utilized to access an online gaming interface (not explicitly shown) for example, one or more of the web servers 310*a* (e.g., that may provide graphical and/or rendering elements for an interface and/or other web services) and/or the application servers 310*b* (e.g., that may provide rule and/or logic-based programming routines, elements, and/or functions—e.g., game play engines) may be called and/or managed by the application delivery controller cluster 322.

In some embodiments, the messaging broker servers 310*c* may receive and/or retrieve messages from the first user device 302*a* (and/or from one or more of the other servers 310*a*-*b*, 310*d*-*g*) and perform one or more inter-application processes in relation thereto. The messaging broker servers 310*c* may, for example, route, transform, consolidate, aggregate, store, augment, and/or otherwise process one or more requests in connection with provision of online gaming services to the first user device 302*a* (e.g., facilitating a decoupling of services provided by various applications on and/or from the various servers 310*a*-*b*, 310*d*-*g*). According to some embodiments, the game broadcaster servers 310*d* may provide scheduled releases of information descriptive of an online game. The game broadcaster servers 310*d* may, for example, provide a broadcast feed of bingo numbers, slot and/or other random (and/or pseudo-random) number results that may be accessed by (and/or transmitted to) the first user device 302*a* (e.g., in connection with the play of an online bingo, slots, and/or other game for which broadcast information may be utilized). In some embodiments, the chat servers 310*e* may provide, manage, and/or facilitate communications between the first user device 302*a* (and/or first user thereof) and one or more other player/user devices (such as a second user device 302*b* and/or other player/user devices not shown in FIG. 3).

According to some embodiments, the second user device 302*b* may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online game provider may, for example, utilize the second user device 302*b* to interface with the privately-accessible VPN 304*d*. The VPN 304*d* may, for example, provide direct access to the application servers 310*b*, the database servers 310*f*, the management and monitoring servers 310*g*, and/or the application delivery controller cluster 322. In some embodiments (as depicted in FIG. 3), such access may be gated through and/or insulated or protected by an internal firewall cluster 308*b*. The second user device 302*b* may, for example, be required to provide credentials to and/or otherwise access the application delivery controller cluster 322 and/or servers 310*a*-*g* via the internal firewall cluster 308*b*.

In some embodiments, the database servers 310*f* may provide access to one or more databases and/or data stores (e.g., not shown in FIG. 3; for data storage and/or retrieval). In some embodiments, the management and monitoring servers 310*g* may provide services such as monitoring, reporting, troubleshooting, analysis, configuring, etc. to the second user device 302*b*. The second user device 302*b* may, for example, access the management and monitoring servers 310*g* and/or the database servers 310*f* to run reports descriptive of online gaming operations, game play, and/or game referral setup, management, and/or analysis. According to some embodiments, either or both of the user devices 302*a*-*b* in conjunction with one or more of the servers 310*a*-*g* and/or the application delivery controller cluster 322 may conduct (in whole or in part), facilitate, and/or otherwise be associated with execution of one or more stored procedures, applications, processes, and/or methods (e.g., the method 600 of FIG. 6 herein, and/or one or more portions thereof) as described herein.

Utilization of the term "server" with respect to the servers 310*a*-*g* of the system 300 of FIG. 3 is meant solely to ease description of the configuration and/or functionality of the servers 310*a*-*g*. The term "server" is not intended to be limiting with respect to any particular hardware, software, firmware, and/or quantities thereof utilized to implement any or all of the servers 310*a*-*g* of the system 300. Similarly, while multiple types and/or instances of the severs 310*a*-*g* are depicted in FIG. 3, any or all of the servers 310*a*-*g* may be implemented in, on, and/or by one or multiple computer server and/or other electronic devices.

Figure 4:
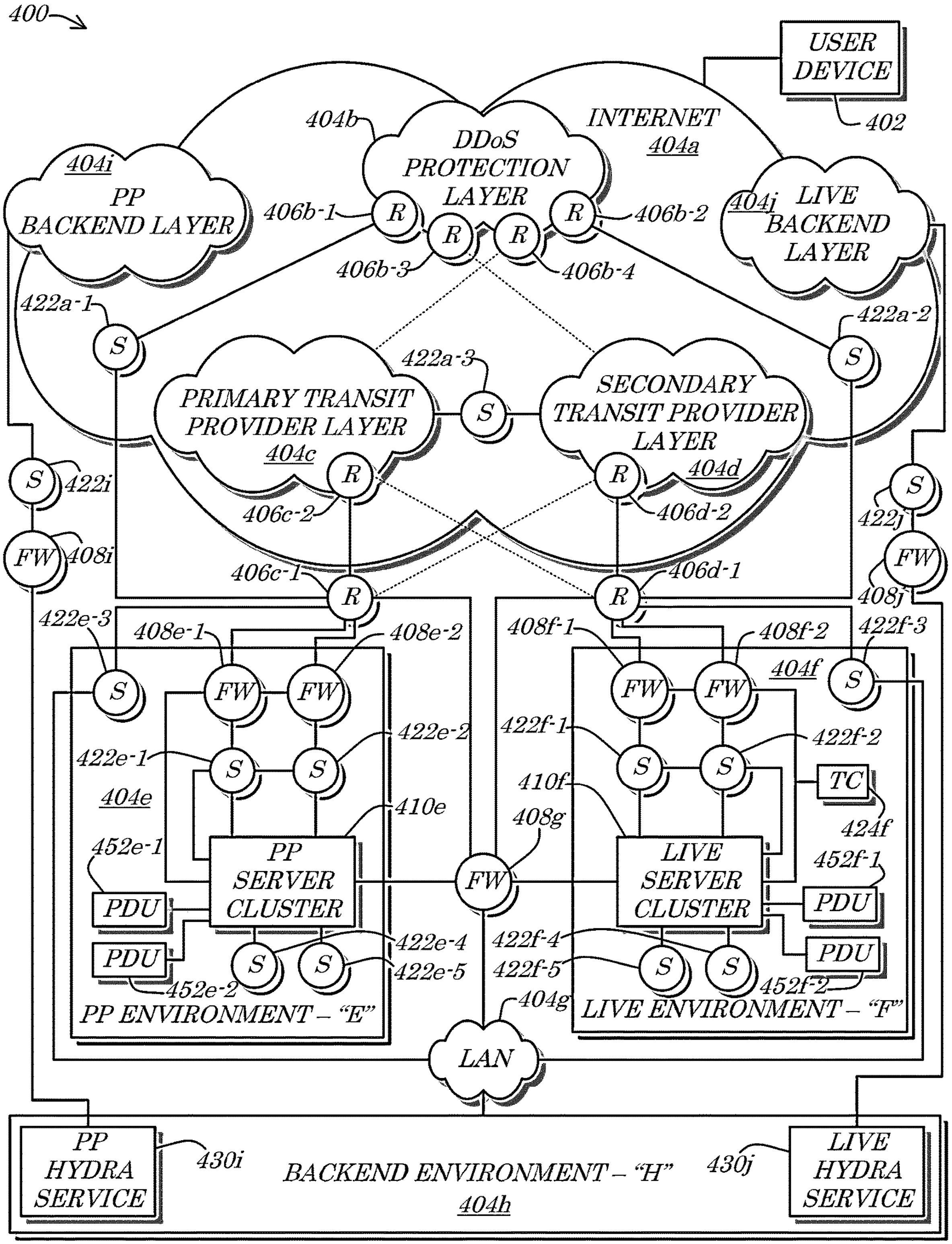
FIG. 4 is a block diagram of a system according to some embodiments.

Referring now to FIG. 4, a block diagram of a system 400 according to some embodiments is shown. In some embodiments, the system 400 may comprise and/or define a "front-end" architecture of a gaming platform such as a platform via which social, multiplayer, and/or online games may be played (e.g., one or more games comprising dynamic wagering sizes as described herein). The system 400 may be similar in configuration and/or functionality, for example, to the system 300 of FIG. 3 and/or one or more portions thereof. In some embodiments, the system 400 may comprise a user device 402, a plurality of networks (and/or environments and/or layers) 404*a*-*j* (e.g., the Internet 404*a*, a Distributed Denial-of-Service (DDoS) protection layer 404*b*, a primary transit provider layer 404*c*, a secondary transit provider layer 404*d*, a Pre-Production (PP) environment 404*e*, a live environment 404*f*, a LAN 404*g*, a backend environment 404_h_, a PP backend layer 404_i_, and/or a live backend layer 404_j_), a plurality of routers 406_b-d_, a plurality of firewall devices 408_e-g_, 408_i-j_, a plurality of servers 410_e-f_ (e.g., a PP server cluster 410_e_ and/or a live server cluster 410_f_), a plurality of switching devices 422_a_, 422_e-f_, 422_i-j_, a Terminal Concentrator (TC) 424_f_, a plurality of "hydra" services 430_i-j_ (e.g., a PP hydra service 430_i_ and/or a live hydra service 430_j_), and/or a plurality of Power Distribution Unit (PDU) devices 452_e-f_.

According to some embodiments, any or all of the components 402, 404_a-j_, 406_b-d_, 408_e-g_, 408_i-j_, 410_e-f_, 422_a_, 422_e-f_, 422_i-j_, 424_f_, 430_i-j_, 452_e-f_ of the system 400 may be similar in configuration and/or functionality to any similarly named and/or numbered components described herein. Fewer or more components 402, 404_a-j_, 406_b-d_, 408_e-g_, 408_i-j_, 410_e-f_, 422_a_, 422_e-f_, 422_i-j_, 424_f_, 430_i-j_, 452_e-f_ (and/or portions thereof) and/or various configurations of the components 402, 404_a-j_, 406_b-d_, 408_e-g_, 408_i-j_, 410_e-f_, 422_a_, 422_e-f_, 422_i-j_, 424_f_, 430_i-j_, 452_e-f_ may be included in the system 400 without deviating from the scope of embodiments described herein. While multiple instances of some components 404_a-j_, 406_b-d_, 408_e-g_, 408_i-j_, 410_e-f_, 422_a_, 422_e-f_, 422_i-j_, 430_i-j_, 452_e-f_ are depicted and while single instances of other components 402, 424_f_ are depicted, for example, any component 402, 404_a-j_, 406_b-d_, 408_e-g_, 408_i-j_, 410_e-f_, 422_a_, 422_e-f_, 422_i-j_, 424_f_, 430_i-j_, 452_e-f_ depicted in the system 400 may comprise a single device, a combination of devices and/or components 402, 404_a-j_, 406_b-d_, 408_e-g_, 408_i-j_, 410_e-f_, 422_a_, 422_e-f_, 422_i-j_, 424_f_, 430_i-j_, 452_e-f_, and/or a plurality of devices, as is or becomes desirable and/or practicable. Similarly, in some embodiments, one or more of the various components 402, 404_a-j_, 406_b-d_, 408_e-g_, 408_i-j_, 410_e-f_, 422_a_, 422_e-f_, 422_i-j_, 424_f_, 430_i-j_, 452_e-f_ may not be needed and/or desired in the system 400.

In some embodiments, the user device 402 may be utilized to access one or more of the PP environment 404_e_, the live environment 404_f_, and/or the backend environment 404_h_ via the Internet 404_a_. In some embodiments, the user device 402 may be utilized to access the backend environment 404_h_ and/or the PP hydra service 430_i_ via the PP backend layer 404_i_. A PP backend switch device 422_i_ and/or a PP backend firewall device 408_i_ may, for example, gate and/or control access to the backend environment 404_h_ and/or the PP hydra service 430_i_, via the PP backend layer 404_i_. In some embodiments, the user device 402 may be utilized to access the backend environment 404_h_ and/or the live hydra service 430_j_ via the live backend layer 404_j_. A live backend switch device 422_j_ and/or a live backend firewall device 408_j_ may, for example, gate and/or control access to the backend environment 404_h_ and/or the live hydra service 430_j_, via the live backend layer 404_j_.

According to some embodiments, any communications (e.g., requests, calls, and/or messages) from the user device 402 may be passed through the DDoS protection layer 404_b_. The DDoS protection layer 404_b_ may, for example, monitor and/or facilitate protection against various forms of cyber attacks including, but not limited to, DDoS attacks. In some embodiments, the DDoS protection layer 404_b_ may comprise and/or be in communication with a plurality of DDoS router devices 406_b_-1, 406_b_-2, 406_b_-3, 406_b_-4 that may be utilized to route and/or direct incoming communications (e.g., from the user device 402) to appropriate portions of the system 400.

In some embodiments, the DDoS protection layer 404_b_ and/or a first DDoS router device 406_b_-1 may route communications from the user device 402 through and/or via a first switch device 422_a_-1 and/or to, through, and/or via a first primary transit provider router device 406_c_-1. In some embodiments, the first switch device 422_a_-1 may comprise a device utilized for security switching such as may implement communications in accordance with the Generic Routing Encapsulation (GRE) communications tunneling protocol described in RFC 2784 "Generic Routing Encapsulation (GRE)" published by the Network Working Group (NWG) in March, 2000. The first primary transit provider router device 406_c_-1 may, for example, provide access to the PP environment 404_e_ and/or the PP server cluster 410_e_ thereof, such as via one or more PP firewall devices 408_e_-1, 408_e_-2 and/or one or more PP switch devices 422_e_-1, 422_e_-2. According to some embodiments, the PP switch devices 422_e_-1, 422_e_-2 may comprise content switching devices that process and route data (e.g., in the data link layer) based on data content. In some embodiments, the first primary transit provider router device 406_c_-1 may direct communications to, through, and/or via a PP LAN switch device 422_e_-3 that provides and/or facilitates access to the LAN 404_g_. The LAN 404_g_ may, for example, provide private access to and/or between the PP environment 404_e_, the live environment 404_f_, and/or the backend environment 404_h_. In some embodiments, the first primary transit provider router device 406_c_-1 and/or the PP LAN switch device 422_e_-3 may direct communications to, through, and/or via a LAN firewall device 408_g_ that provides direct access to either or both of the PP server cluster 410_e_ and the live server cluster 410_f_.

According to some embodiments, the DDoS protection layer 404_b_ and/or a second DDoS router device 406_b_-2 may route communications from the user device 402 through and/or via a second switch device 422_a_-2 and/or to, through, and/or via a first secondary transit provider router device 406_d_-1. In some embodiments, the second switch device 422_a_-2 may comprise a device utilized for security switching such as may implement communications in accordance with the GRE communications tunneling protocol. The first secondary transit provider router device 406_d_-1 may, for example, provide access to the live environment 404_f_ and/or the live server cluster 410_f_ thereof, such as via one or more live firewall devices 408_f_-1, 408_f_-2 and/or one or more live switch devices 422_f_-1, 422_f_-2. According to some embodiments, the live switch devices 422_f_-1, 422_f_-2 may comprise content switching devices that process and route data (e.g., in the data link layer) based on data content. In some embodiments, the first secondary transit provider router device 406_d_-1 may direct communications to, through, and/or via a live LAN switch device 422_f_-3 that provides and/or facilitates access to the LAN 404_g_. In some embodiments, the first secondary transit provider router device 406_d_-1 and/or the live LAN switch device 422_f_-3 may direct communications to, through, and/or via the LAN firewall device 408_g_ that provides direct access to either or both of the PP server cluster 410_e_ and the live server cluster 410_f_.

In some embodiments, the DDoS protection layer 404_b_ and/or one or more of a third DDoS router device 406_b_-3 and/or a fourth DDoS router device 406_b_-4 may route communications from the user device 402 through and/or via one or more of the primary transit provider layer 404_c_ and/or the secondary transit provider layer 404_d_. In some embodiments, a transit provider switch device 422_a_-3 may direct, swap, route, and/or manage communications between the primary transit provider layer 404_c_ and the secondary transit provider layer 404_d_. According to some embodiments, the transit provider switch device 422_a_-3 may comprise a switching device that operates in accordance with an Exterior Border Gateway Protocol (EBGP)—e.g., the transit provider switch device 422*a*-3 may comprise one or more edge or border routers. In some embodiments, the first primary transit provider router device 406*c*-1, the first secondary transit provider router device 406*d*-1, a second primary transit provider router device 406*c*-2, and/or a second secondary transit provider router device 406*d*-2 may be utilized to route and/or direct communications between (i) the primary transit provider layer 404*c* and/or the secondary transit provider layer 404*d* and (ii) the PP environment 404*e* and/or the live environment 404*f*.

According to some embodiments, the PP server cluster 410*e* and/or the PP environment 404*e* may comprise various hardware, software, and/or firmware that permits a user (e.g., of the user device 402) to program, edit, manage, and/or otherwise interface with PP game elements and/or interfaces (e.g., for development and/or testing purposes). In some embodiments, the PDU devices 452*e*-1, 452*e*-2 may generally provide power distribution, supply, management, backup, and/or conditioning services (e.g., to the PP server cluster 410*e*) as is or becomes desired. According to some embodiments, additional switch devices 422*e*-4, 422*e*-5 may be utilized to distribute, balance, manage and/or control communications to, from, and/or within the PP server cluster 410*e*.

In some embodiments, the live server cluster 410*f* and/or the live environment 404*f* may comprise various hardware, software, and/or firmware that permits a user (e.g., of the user device 402) to program, edit, manage, and/or otherwise interface with live game elements and/or interfaces (e.g., for troubleshooting, corrective, and/or live environment management purposes). In some embodiments, the PDU devices 452*f*-1, 452*f*-2 may generally provide power distribution, supply, management, backup, and/or conditioning services (e.g., to the live server cluster 410*f*) as is or becomes desired. According to some embodiments, additional switch devices 422*f*-4, 422*f*-5 may be utilized to distribute, balance, manage and/or control communications to, from, and/or within the live server cluster 410*f*. In some embodiments, the TC device 424*f* may be utilized to manage communications from a variety of data sources such as by providing communication capability between various communications channels (not separately depicted in FIG. 4).

According to some embodiments, the user device 402 in conjunction with the live server cluster 410*f* (e.g., via the Internet 404*a*) may conduct (in whole or in part), facilitate, and/or otherwise be associated with execution of one or more stored procedures, applications, processes, and/or methods (e.g., the method 600 of FIG. 6 herein, and/or one or more portions thereof) as described herein.

Figure 5:
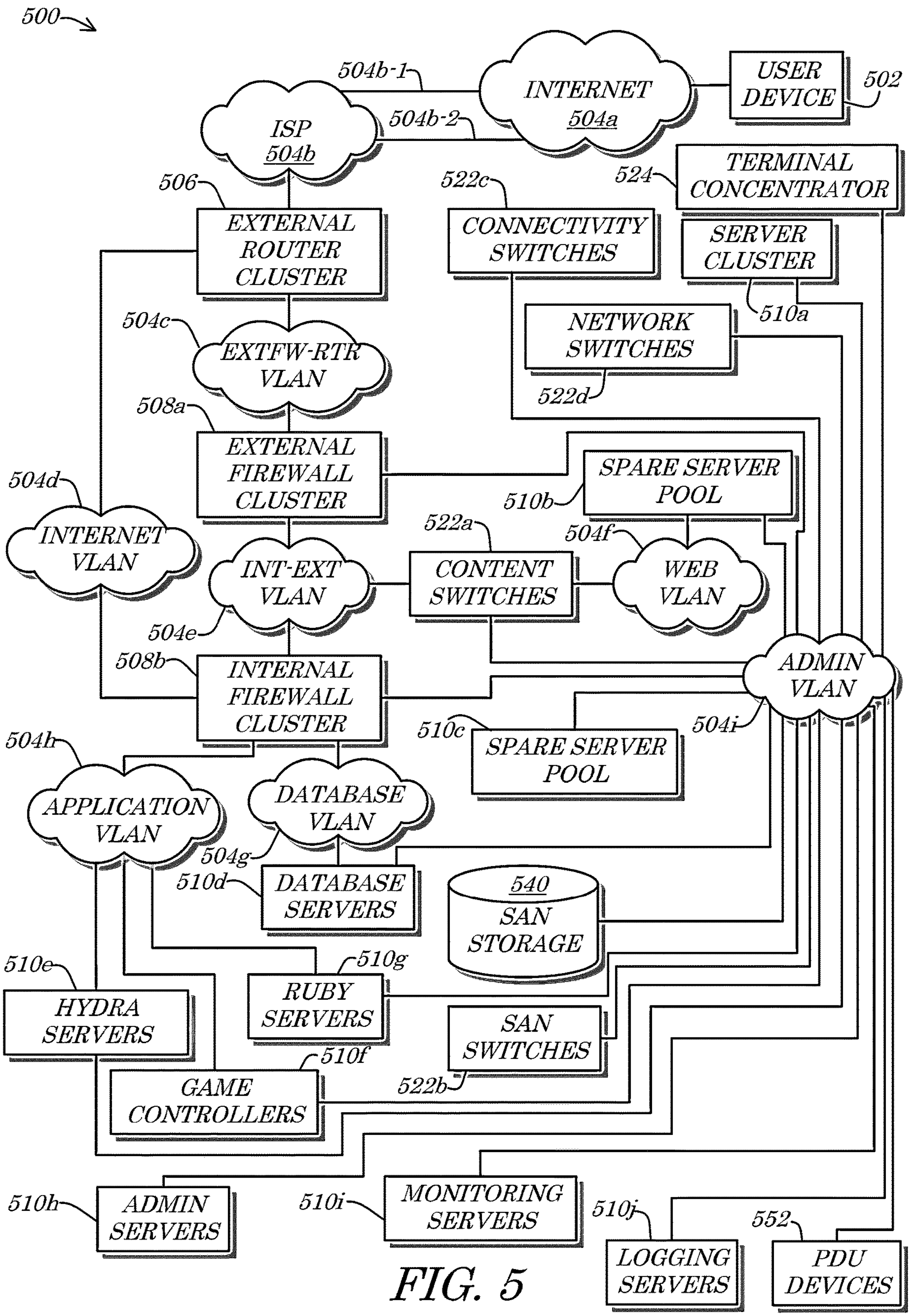
FIG. 5 is a block diagram of a system according to some embodiments.

Turning to FIG. 5, a block diagram of a system 500 according to some embodiments is shown. In some embodiments, the system 500 may comprise and/or define a "back-end" architecture of a gaming platform such as a platform via which social, multiplayer, and/or online games may be played (e.g., one or more games comprising dynamic wagering sizes as described herein). The system 500 may be utilized in conjunction with the systems 300, 400 if FIG. 3 and/or FIG. 4 herein, for example, and/or may be similar in configuration and/or functionality to the backend environment 404*h* of the system 400 of FIG. 4. In some embodiments, the system 500 may comprise a user device 502, a plurality of networks (and/or environments and/or layers) 504*a-i* (e.g., the Internet 504*a*, an ISP 504*b*, an External Firewall-Router (EXTFW-RTR) Virtual LAN (VLAN) 504*c*, an Internet VLAN 504*d*, an Internal-External (INT-EXT) VLAN 504*e*, a web VLAN 504*f*, a database VLAN 504*g*, an application VLAN 504*h*, and/or an administrator VLAN 504*i*), an external router cluster 506, a plurality of firewall clusters 508*a-b* (e.g., an external firewall cluster 508*a* and/or an internal firewall cluster 508*b*), a plurality of servers 510*a-j* (e.g., a server cluster 510*a*, a first spare server pool 510*b*, a second spare server pool 510*c*, database servers 510*d*, "hydra" servers 510*e*, game controllers 510*f*, ruby servers 510*g*, admin servers 510*h*, monitoring servers 510*i*, and/or logging servers 510*j*), a plurality of switches 522*a-d* (e.g., content switches 522*a*, Storage Area Network (SAN) switches 522*b*, connectivity switches 522*c*, and/or network switches 522*d*), a TC device 524, a SAN storage device 540, and/or one or more PDU devices 552.

According to some embodiments, any or all of the components 502, 504*a-l*, 506, 508*a-b*, 510*a-j*, 522*a-d*, 524, 540, 552 of the system 500 may be similar in configuration and/or functionality to any similarly named and/or numbered components described herein. Fewer or more components 502, 504*a-l*, 506, 508*a-b*, 510*a-j*, 522*a-d*, 524, 540, 552 (and/or portions thereof) and/or various configurations of the components 502, 504*a-l*, 506, 508*a-b*, 510*a-j*, 522*a-d*, 524, 540, 552 may be included in the system 500 without deviating from the scope of embodiments described herein. While multiple instances of some components 504*a-l*, 508*a-b*, 510*a-j*, 522*a-d* are depicted and while single instances of other components 502, 506, 524, 540, 552 are depicted, for example, any component 502, 504*a-l*, 506, 508*a-b*, 510*a-j*, 522*a-d*, 524, 540, 552 depicted in the system 500 may comprise a single device, a combination of devices and/or components 502, 504*a-l*, 506, 508*a-b*, 510*a-j*, 522*a-d*, 524, 540, 552, and/or a plurality of devices, as is or becomes desirable and/or practicable. Similarly, in some embodiments, one or more of the various components 502, 504*a-l*, 506, 508*a-b*, 510*a-j*, 522*a-d*, 524, 540, 552 may not be needed and/or desired in the system 500.

In some embodiments, the user device 502 may be utilized to access and/or interface with one or more of the servers 510*a-j* via the Internet 504*a*. In some embodiments, the Internet 502*a* may be linked to the ISP 504*b* via multiple (e.g., redundant) connectivity paths 504*b*-1, 504*b*-2 (e.g., for load balancing, security, and/or failure recovery). According to some embodiments, the ISP 504*b* may be in communication with (and/or comprise) the external router cluster 506. The external router cluster 506 may route certain requests, calls, and/or transmissions (and/or users—e.g., based on credentials and/or other information) through the EXTFW-RTR VLAN 504*c* and/or through the external firewall cluster 508*a*, for example, and/or may route certain requests, calls, and/or transmissions (and/or users—e.g., based on credentials and/or other information) through the Internet VLAN 504*d* and/or through the internal firewall cluster 508*b*.

In the case that a user (not shown) of the user device 502 comprises an online game player, consumer, and/or other member of the public, for example, the external router cluster 506 may direct communications through the EXTFW-RTR VLAN 504*c* and/or through the external firewall cluster 508*a*. In the case that the user of the user device 502 comprises a programmer, tester, employee, and/or other agent of a game provider and/or other entity that operates the system 500, for example, the external router cluster 506 may direct communications through the Internet VLAN 504*d* and/or through the internal firewall cluster 508*b*. In some embodiments, access via either or both of the external firewall cluster 508*a* and/or the internal firewall cluster 508*b* may permit the user device 502 to communicate via the INT-EXT VLAN 504*e*. The INT-EXT VLAN 504*e* may, for example, provide access to the content switches

522*a* which may, in some embodiments, serve content from any or all of the servers 510*a-j* to the user device 502, as is or becomes appropriate or desired. In some embodiments, the content switches 522*a* may communicate with the first spare server pool 510*b* via the web LAN 504*f*.

According to some embodiments, private and/or other specialized access to the system 500 via the internal firewall cluster 508*b* may permit the user device 502 to communicate via one or more of the database VLAN 504*g*, the application VLAN 504*h*, and/or the admin VLAN 504*i*. The database VLAN 504*g* may be utilized, for example, to access and/or communicate with the database servers 510*d*. In some embodiments, the application VLAN 504*h* may be utilized to access and/or communicate with any or all of the hydra servers 510*e*, the game controllers 510*f*, and/or the ruby servers 510*g*.

The admin VLAN 504*i* may allow, promote, conduct, facilitate, and/or manage a wide variety of communications within the system 500. The admin VLAN 504*i* may, for example, communicatively connect and/or couple any or all of the firewalls 508*a-b*, the servers 510*a-j*, the switches 522*a-d*, the TC device 524, the SAN storage 540, and/or the PDU devices 552. The user device 502 may be utilized, in conjunction with the admin servers 510*h* and/or via the admin VLAN 504*i* for example, to define, edit, adjust, manage, and/or otherwise access settings (and/or data) of the firewalls 508*a-b*, any or all of the switches 522*a-d*, the TC device 524, and/or the PDU devices 552. In some embodiments, the user device 502 (and/or the admin servers 510*h*) may be utilized to manage and/or access content, rules, settings, and/or performance characteristics or preferences for any or all of the servers 510*a-j*.

In some embodiments, the server cluster 510*a* may comprise one or more servers and/or other electronic controller devices (e.g., blade servers) configured to provide online gaming data (e.g., interfaces (such as the example interfaces 720*a-b* of FIG. 7A and/or FIG. 7B herein), outcomes, and/or results) to the user device 502. According to some embodiments, the first spare server pool 510*b* and/or the second spare server pool 510*c* may comprise one or more server and/or other electronic controller devices configured to supplement and/or replace the server cluster 510*a* as needed and/or desired (e.g., to manage load and/or error recovery situations). In some embodiments, the database servers 510*c* may provide and/or manage access to stored data such as data stored in and/or by the SAN storage device 540. In some embodiments, the hydra servers 510*e* and/or the game controllers 510*f* may provide online game information such as interfaces, results, graphics, sounds, and/or other media to the user device 502 (e.g., via the application VLAN 504*h*). In some embodiments, the ruby servers 510*g* may comprise one or more processing devices configured to provide access to one or more programming languages (e.g., "Ruby") and/or Application Programming Interface (API) mechanisms via which the servers 510*a-j* and/or other portions of the system 500 may be configured to operate (e.g., in accordance with specially and/or pre-programmed instructions written in the programming language and/or developed by the API provided by the ruby servers 510*g*). According to some embodiments, the admin servers 510*h*, the monitoring servers 510*i*, and/or the logging servers 510*j* may be utilized and/or configured to provide administrative, parameter and/or metric monitoring and/or reporting, and/or data logging and/or audit services, respectively.

According to some embodiments, the user device 502 in conjunction with one or more of the servers 510*a-j* (e.g., via the Internet 504*a*) may conduct (in whole or in part), facilitate, and/or otherwise be associated with execution of one or more stored procedures, applications, processes, and/or methods (e.g., the method 600 of FIG. 6 herein, and/or one or more portions thereof) as described herein.

IV. Methods

Figure 6:
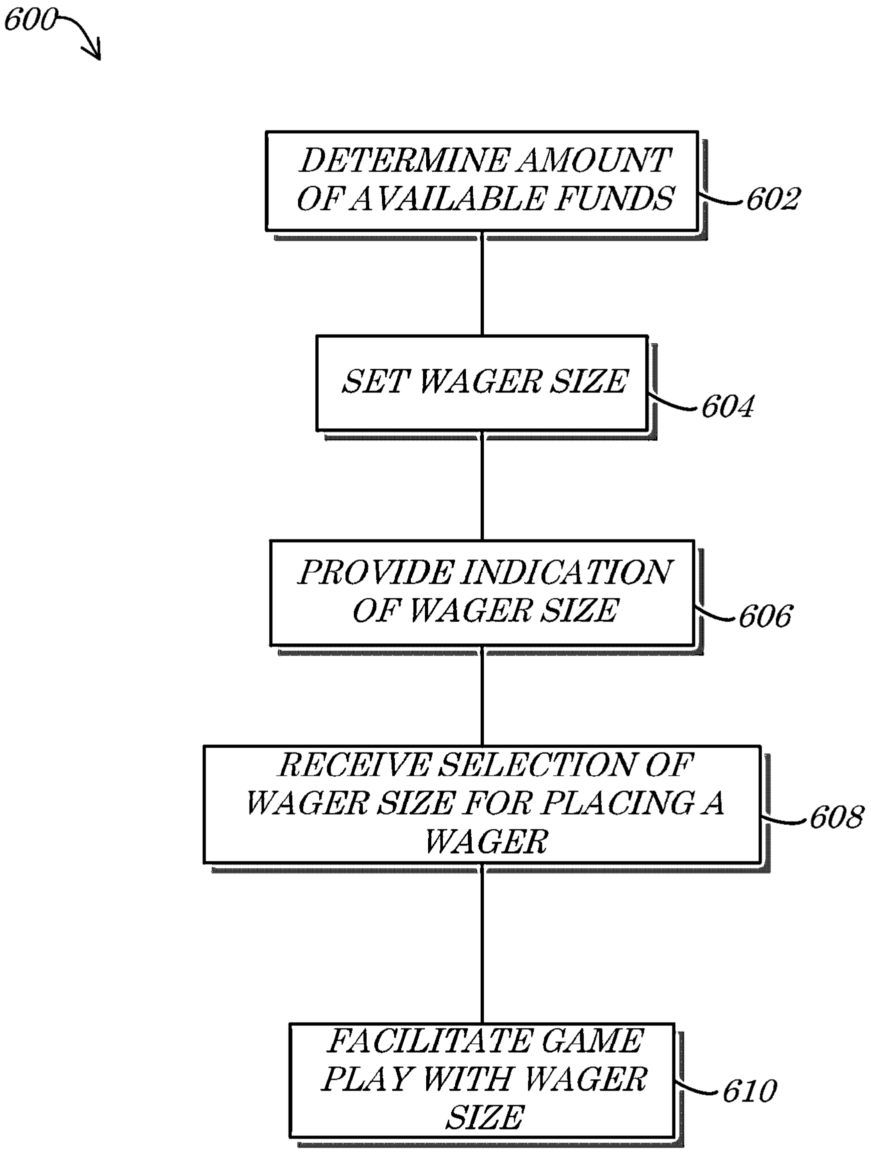
FIG. 6 is a flow diagram of a method according to some embodiments.

Referring now to FIG. 6, a flow diagram of a method 600 according to some embodiments is shown. In some embodiments, the method 600 may be performed and/or implemented by and/or otherwise associated with one or more specialized and/or computerized processing devices (e.g., the player and/or user devices 102*a-n*, 202*a-n*, 302*a-b*, 402, 502 and/or the servers, apparatus, and/or controller devices 110, 210*a-n*, 310*a-g*, 410*e-f*, 510*a-j*, 810 of FIG. 1, FIG. 2, FIG. 3, FIG. 4, FIG. 5, and/or FIG. 8 herein), specialized computers, computer terminals, computer servers, computer systems and/or networks, and/or any combinations thereof (e.g., by one or more online game providers and/or online gaming player processing devices). In some embodiments, the method 600 may be embodied in, facilitated by, and/or otherwise associated with various input mechanisms and/or interfaces (such as the example interfaces 720*a-b* of FIG. 7A and/or FIG. 7B herein).

The process and/or flow diagrams described herein do not necessarily imply a fixed order to any depicted actions, steps, and/or procedures, and embodiments may generally be performed in any order that is practicable unless otherwise and specifically noted. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

In some embodiments, the method 600 may comprise determining (e.g., by a processing device and/or via an electronic communications network device) an amount of available funds (and/or other player variable), at 602. Various variables and/or characteristics associated with and/or descriptive of a player of a game may, for example, be determined. In some embodiments, an amount of currency and/or currency equivalent that has been deposited, earned, and/or committed to a game, website, machine, and/or account may be determined. An amount of virtual currency available in an account assigned to and/or associated with the player may, for example, be queried and/or determined. According to some embodiments, an amount of coin-in to a wagering game and/or wagering-style game, a credit balance, a win amount, and/or a wager amount may be determined. In some embodiments, the determined amount and/or balance may be associated with and/or descriptive of a plurality of players such as a group, category, and/or team of players. According to some embodiments, variables other than or in addition to total amounts and/or balances may be determined, such as, but not limited to, averages, minimums, maximums, tiers, classifications, and/or frequencies. In some embodiments, various player attributes and/or characteristics such as demographic data, geographic location data, game play history, game play style, game play success (e.g., wins/losses, scores, standings), and/or other metrics may be determined.

Player variable data may be determined, in some embodiments, based on stored data descriptive of the player (such as in association with a pre-established player account) and/or may be received from the player (e.g., and/or a device thereof) and/or a third-party (e.g., and/or a device thereof). In some embodiments, such as in the case that the player data comprises funds and/or balance data, the player data may be received from, provided by, and/or retrieved, queried, and/or polled from a gaming device and/or gaming application and/or module. In indication of an amount of coin-in, credit balance, and/or win amount may be determined, for example, based on signals received by input devices associated with a game—e.g., physical input devices such as coin acceptance mechanisms for physical gaming devices accepting physical currency and/or GUI and/or other interface input device such as screen elements for electronic and/or virtual games operating via one or more electronic gaming devices.

According to some embodiments, the method 600 may comprise setting (e.g., by the processing device and/or via the electronic communications network device) a wager size, at 604. A wagering game and/or wager-style game that comprises a max bet option and/or setting, for example, may have the value and/or level of the max bet set based on the amount of funds (and/or other player variable) determined at 602. A game having a standard or default max bet of five (5) credits, for example, may be modified to raise the max bet to ten (10) credits (or some other predefined increased max bet threshold; e.g., a "first max bet threshold") in the case that a player's balance increases to or surpasses a certain level (e.g., a predefined account and/or credit balance threshold; e.g., a "first balance threshold"). Similarly, the max bet may be modified to lower the max bet to two (2) credits (or some other predefined decreased max bet threshold; e.g., a "second max bet threshold") in the case that the player's balance decreases to or dips below a certain level (e.g., a predefined account and/or credit balance threshold; e.g., a "second balance threshold"). According to some embodiments, the max bet (and/or other wager sizes) may be set upon game initiation and a determination of a starting amount of credits/funds available to the player. In some embodiments, the max bet (and/or other wager sizes) may be set and/or modified during game play, between game plays, and/or between game play sessions—e.g., based upon dynamic changes to the player's balance (and/or other player variable(s)).

In some embodiments, such as in the case that a player is presented with a plurality of predefined wager size options, one or more of such options may be set and/or modified at 604. A default set of wagering options may allow the player to place wagers of one (1), two (2), and four (4) credits/dollars/etc., for example. In accordance with some embodiments, the wagering options may be increased (doubled, for example) in the case that the player's credit balance reaches some predetermined threshold such as five hundred (500) credits—e.g., the wagering options may change to two (2), four (4), and eight (8) credits, respectively. In some cases, the wagering options may be decreased in magnitude and/or quantity. The default wagering options may be modified, for example, in the case that the player experiences a large loss (large being defined by a loss value that exceeds a predetermined loss threshold), so that the only remaining wagering option is one (1) credit.

According to some embodiments, wagering sizes and/or options may be set based on one or more predetermined formulas and/or rules that take into account the amount of funds (and/or other player variable(s)) determined at 602. Max bet wager sizes may be set at ten percent (10%) of a player's account balance, for example, and may be maintained at (or under) that loss risk percent threshold as game play continues. The max bet may be decremented by whole number (or multiple number—e.g., by fives, tens, etc.) increments as the player's funds decrease, for example, thereby maintaining the max bet at a value level that does not exceed the predetermined loss risk percent threshold for the player. Similarly, as the player's balance increases, so may the max bet (and/or other wager sizes), as a percentage of the player's balance (and/or other variable). According to some embodiments, wager size options may be calculated based on stored formulas and/or rules and may then be rounded to whole number variants thereof. A calculated wager size option of twenty-three and six tenths (23.6) may be rounded down to twenty-three (23) or twenty (20; e.g., a multiple of two (2) or five (5)) in the case that the wager size is desired not to exceed the calculated value, be rounded up to twenty-four (24) or thirty (30; e.g., a multiple of two (2) or five (5)) in the case that the wager size is desired not to be below the calculated value.

In some embodiments, the method 600 may comprise providing (e.g., by the processing device) an indication of the wager size, at 606. The wager size(s) determined at 604, for example, may be provided to the player (and/or to a device operated by the player) as one or more GUI and/or other interactive elements. In such a manner, for example, the player may be provided with the opportunity and/or functionality to select and/or indicate a desire to activate the provided wager size(s) and/or a subset thereof. In the case that multiple available wager sizes are presented to the player, for example, the player may (e.g., as part of the game play process) be required to select one or more of the provided wager sizes. Wager sizes presented as interactive GUI elements such as interface buttons (e.g., physical buttons or keys and/or "soft" (e.g., virtual and/or display device generated) buttons or keys) may be utilized, for example, to accept player input defining one or more wagers in accordance with the available wager size(s).

According to some embodiments, the method 600 may comprise receiving (e.g., by the processing device) an indication of a selection of the wager size, at 608. In the case that the available wager sizes are provided via one or more interactive GUI elements, for example, player input may be received via one or more of such elements. As an example, in the case that the player is provided with five (5) wager size options ranging from one (1) to five (5) credits in single whole number credit increments, the player may choose one of the available options such as the three (3) credit wagering option. In some embodiments, the selection of the three (3) credit wager size option may comprise the player providing input via an input element assigned to and/or otherwise associated with the three (3) credit option. A GUI input button with the label "3 credits" or "bet 3" may be selected by the player, for example, and an input signal received via the button may be received by one or more processing devices such as a player device and/or controller device. The signal received via the button may be indicative of the desired one of the available wager size options.

In some embodiments, the method 600 may comprise facilitating (e.g., by the processing device and/or via the electronic communications network device) game play in accordance with the wager size, at 610. The wager size option(s) selected, chosen, and/or indicated by the player may, for example, be utilized to define a magnitude of one or more wagers to be placed in a wagering and/or wager-style game. In the case of the example selection of the wager size option of three (3) credits, for example, a wager (or pseudo wager in the case of wager-style games) may be placed on behalf of the player for an amount corresponding to the selected option—i.e., a three (3) credit wager. In some embodiments, such as in the case of slot-style games, the wager amount(s) determined to correspond to the selected wager size option(s) may be placed in multiples—e.g., once per payline played. In some embodiments, the processing device may conduct and/or manage game play. The processing device may comprise, for example, a processing device of a mobile player device and/or player PC, tablet, and/or smart phone or may comprise the processing device of a computer server, web server, etc. In some embodiments, the game may be conducted in part by the player's device (e.g., a client device) and in part by a remote and/or central controller device (e.g., a server device). In some embodiments, a winning outcome and/or result of the game may be determined, such as based on data from a Random Number Generator (RNG), and/or a payout may be provided to the player. The payout may, for example, be based on the wager size option(s) determined based on the player data and selected by the player.

According to some embodiments, the available wager size options may be updated as game play progresses. As the player's account balance increases, such as based on winnings from the game for example, the available wager size options may be dynamically (e.g., during game play and/or during a game play session) modified to reflect the changes in the underlying player variable(s) upon which the wager size options are based.

In some embodiments, the player may comprise a first player and the available wager sizes and/or options may comprise a first set of available wager sizes and/or options. A second player may be provided with a second set of available wager sizes and/or options that differ from the first set. In the case that the player variable utilized for the second player (e.g., to determine the second set of available wager sizes) differs from the player variable utilized for the first player (in type and/or magnitude or value), for example, the available wager size options determined therefrom may accordingly differ (in number, type, and/or magnitude or value). In such a manner, for example, players having different credit balances, different account balances, different credit limits, different occupations, different residency locations, different current locations, and/or other differing characteristics and/or attributes, may be provided with differing wagering options in a given game and/or on a given gaming device and/or website.

V. Interfaces

Figure 7A:
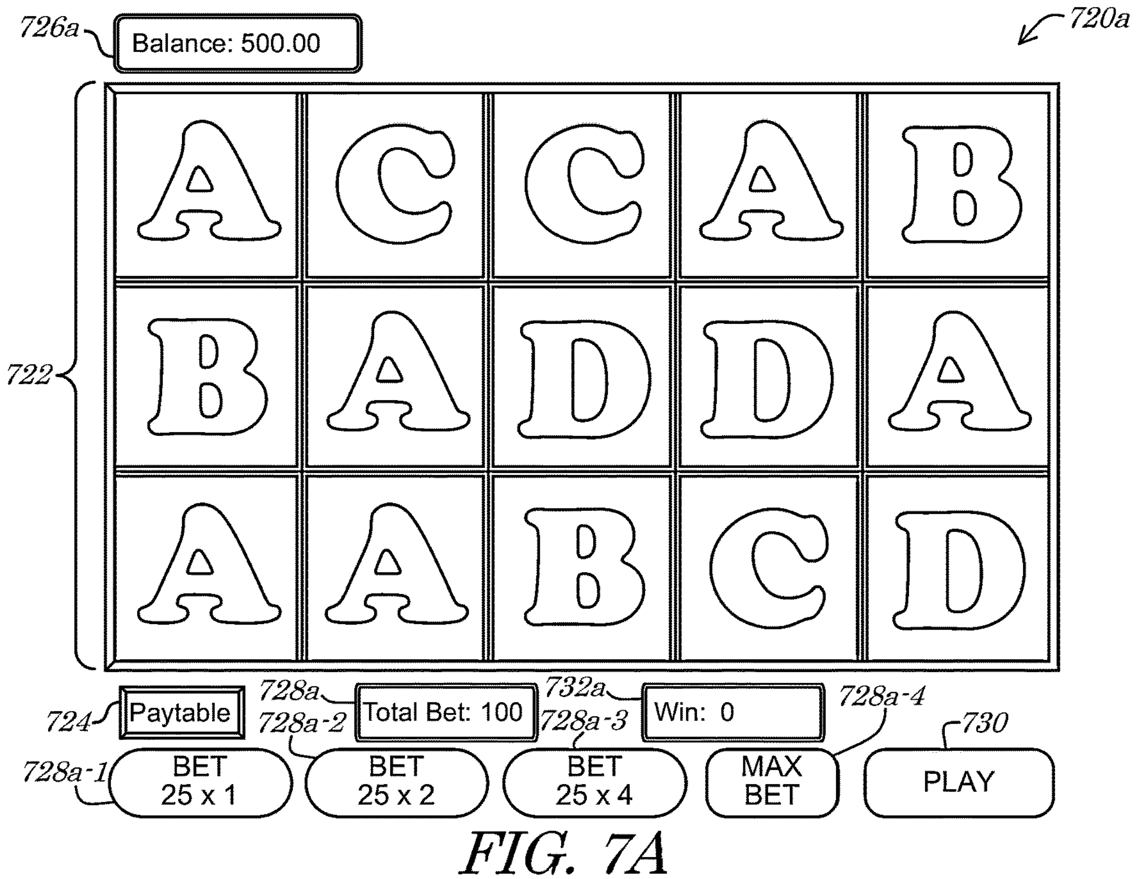
FIG. 7A and FIG. 7B are diagrams of example interfaces according to some embodiments.
Figure 7B:
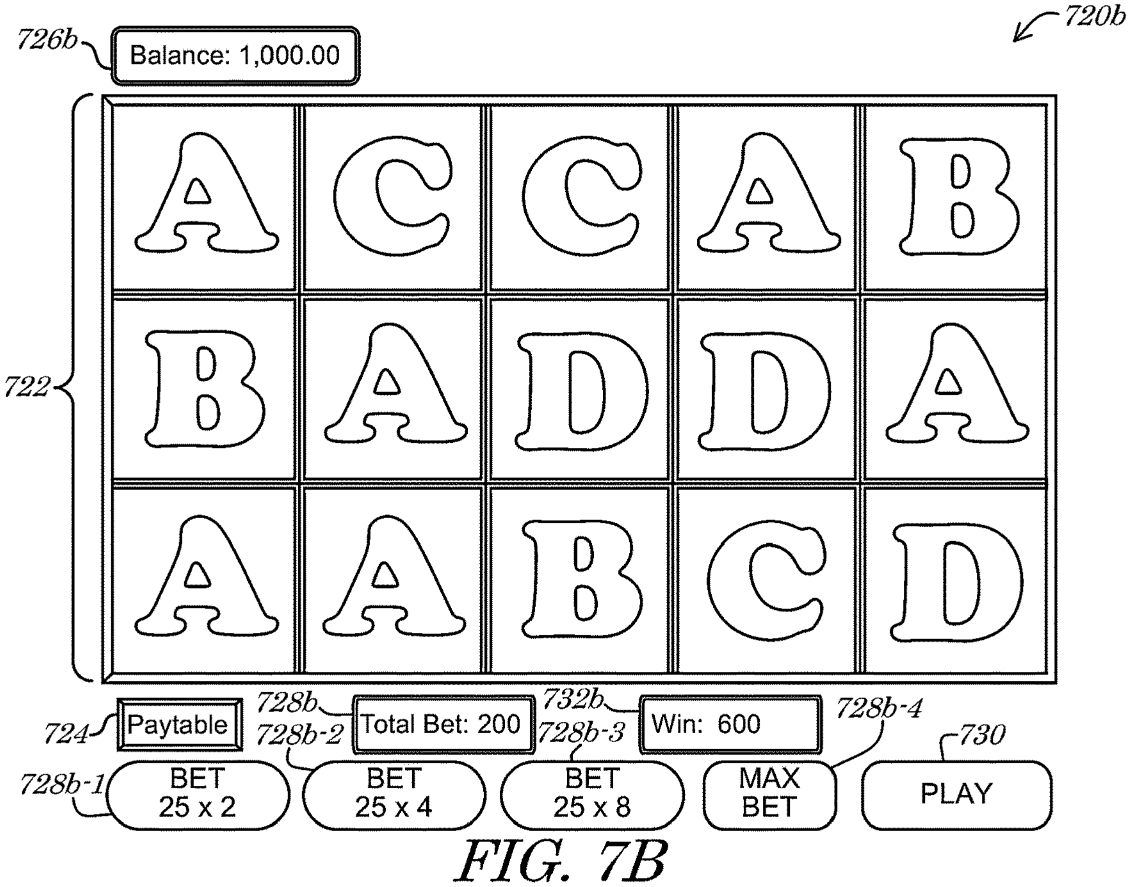

Turning now to FIG. 7A and FIG. 7B, example interfaces 720*a-b* according to some embodiments are shown. In some embodiments, the interfaces 720*a-b* may comprise one or more of a web page, web form, database entry form, API, spreadsheet, table, and/or application or other GUI via which a player may interact with (e.g., setup and/or play) game comprising dynamic wager sizes, as described herein. The interfaces 720*a-b* may, for example, comprise a front-end of an online, social, network, and/or wagering game program (and/or portion thereof) and/or platform programmed and/or otherwise configured to execute, conduct, and/or facilitate the method 600 of FIG. 6 and/or portions thereof described herein. In some embodiments, the interfaces 720*a-b* may be output via a computerized device (e.g., a processor or processing device) such as one or more of the player and/or user devices 102*a-n*, 202*a-n*, 302*a-b*, 402, 502 and/or the servers, apparatus, and/or controller devices 110, 210*a-n*, 310*a-g*, 410*e-f*, 510*a-j*, 810 of FIG. 1, FIG. 2, FIG. 3, FIG. 4, FIG. 5, and/or FIG. 8 herein. In some embodiments, the example interfaces 720*a-b* may comprise interface outputs of (and/or otherwise associated with) a GUI utilized to conduct and/or play an online game comprising dynamic wagering sizes, such as may be implemented and/or provided as described herein.

In some embodiments, a first example interface 720*a* may comprise a game play area 722 (e.g., represented for exemplary but non-limiting purposes as a slot-style game symbol matrix), a paytable button 724, a first credit balance indicator 726*a* (e.g., that indicates a first credit balance of five hundred (500) credits, as depicted for exemplary purposes only), and/or a first total bet indicator 728*a*. According to some embodiments, the first total bet indicator 728*a* may be populated with first total bet data (e.g., one hundred (100) credits, as depicted for exemplary purposes only) based on input received via one or more first bet buttons 728*a*-1, 728*a*-2, 728*a*-3, 728*a*-4. A first one of the first bet buttons 728*a*-1 may be associated with (e.g., linked and/or assigned to) a first low wager amount of one (1) credit per payline (e.g., twenty-five (25) available paylines as depicted for exemplary purposes—for a total bet of twenty-five (25) credits), a second one of the first bet buttons 728*a*-2 may be associated with (e.g., linked and/or assigned to) a first middle wager amount of two (2) credits per payline (e.g., for a total bet of fifty (50) credits), and/or a third one of the first bet buttons 728*a*-3 may be associated with (e.g., linked and/or assigned to) a first high wager amount of four (4) credits per payline (e.g., for a total bet of one hundred (100) credits, as depicted for exemplary purposes only).

According to some embodiments, a fourth one of the first bet buttons 728*a*-4 may be associated with (e.g., linked and/or assigned to) a "max bet" per payline. The fourth one of the first bet buttons 728*a*-4 may comprise a shortcut to selection of the maximum bet allowed and/or available, such as a shortcut to the third one of the first bet buttons 728*a*-3 and/or underlying first high wager amount thereof (e.g., for a total max bet of one hundred (100) credits), as depicted for example, or may be associated with (e.g., linked and/or assigned to) a maximum wager amount that is higher than the first high wager amount (e.g., a fifth wager amount not depicted in FIG. 7A or FIG. 7B, such as a maximum wager amount of ten (10) credits per payline, for a total bet of two hundred and fifty (250) credits). Activation of (e.g., specifically directed user/player input) one or more of the first bet buttons 728*a*-1, 728*a*-2, 728*a*-3, 728*a*-4 may, in some embodiments, cause calculation, population, and/or determination of the first total bet indicator 728*a* and/or the first total bet data. In the example of FIG. 7A, the third one of the first bet buttons 728*a*-3 or the fourth one of the first bet buttons 728*a*-4 has been activated, causing the first total bet indicator 728*a* to display the first total bet amount (e.g., four (4) credits times twenty-five (25) paylines equals a total first bet/first max bet of one hundred (100) credits, as depicted for exemplary purposes only).

In some embodiments, the first interface 720*a* may comprise a play activation button 730. The play activation button 730 may, for example, accept input and in response cause (e.g., a processing device may respond to the received indication of a desire to initiate game play) an initiation of a play and/or session of the game (e.g., represented by changing game elements within the game play area 722). A game program may be executed in response to the received input (e.g., received via the play activation button 730), for example, and game data such as game outcomes and/or results may be provided via the game play area 722. In some embodiments, a determination may be made as to whether the player has achieved a first winning (or losing) outcome in the game (e.g., based on data received from an RNG and/or based on stored rules governing play of the game). In the case that a first winning outcome is determined, the first total bet amount displayed by the first total bet indicator 728*a* may be utilized in conjunction with a paytable (e.g., available for display via the paytable button 724) to determine an applicable first win amount. In some embodiments, any applicable first win amount may be displayed by a first win indicator 732*a* (e.g., in the example of FIG. 7A, no first win has been achieved).

According to some embodiments, a second example interface 720*b* may comprise the game play area 722, the paytable button 724, a second credit balance indicator 726*b* (e.g., that indicates a second credit balance of one thousand (1,000) credits, as depicted for exemplary purposes only), a second total bet indicator 728*b* populated with second total bet data (e.g., two hundred (200) credits, as depicted) based on input received via one or more second bet buttons 728*b*-1, 728*b*-2, 728*b*-3, 728*b*-4, the play activation button 730, and/or a second win indicator 732*b* (e.g., populated with second win amount data—e.g., six hundred (600) credits, as depicted for exemplary purposes only). In some embodiments, a first one of the second bet buttons 728*b*-1 may be associated with (e.g., linked and/or assigned to) a second low wager amount of two (2) credits per payline (e.g., twenty-five (25) available paylines as depicted for exemplary purposes—for a total bet of fifty (50) credits), a second one of the second bet buttons 728*a*-2 may be associated with (e.g., linked and/or assigned to) a second middle wager amount of four (4) credits per payline (e.g., for a total bet of one hundred (100) credits, as depicted for exemplary purposes only), and/or a third one of the second bet buttons 728*a*-3 may be associated with (e.g., linked and/or assigned to) a second high wager amount of eight (8) credits per payline (e.g., for a total bet of two hundred (200) credits, as depicted for exemplary purposes only).

Similarly, a fourth one of the second bet buttons 728*b*-4 may be associated with (e.g., linked and/or assigned to) a "max bet" per payline. The fourth one of the second bet buttons 728*b*-4 may comprise a shortcut to selection of the maximum bet allowed and/or available, such as a shortcut to the third one of the second bet buttons 728*b*-3 and/or underlying second high wager amount thereof (e.g., for a total max bet of two hundred (200) credits), as depicted for example, or may be associated with (e.g., linked and/or assigned to) a maximum wager amount that is higher than the second high wager amount (e.g., a fifth wager amount not depicted in FIG. 7A or FIG. 7B, such as a maximum wager amount of twenty (20) credits per payline, for a total bet of five hundred (500) credits).

In some embodiments, the second example interface 720*b* may comprise a modified and/or updated version of the first example interface 720*a*. The second example interface 720*b* may, for example, comprise a version of the first example interface 720*a* that is modified to include dynamically-adjusted wager sizes, e.g., based on player data as described herein. The player utilizing the first example interface 720*a* to play the game, for example, may utilize the first total bet amount of one hundred (100) credits (leaving a credit balance of four hundred (400) credits) to wager (real or pseudo) on a play of the game. Continuing the example (while not expressly depicted by the contents of the example game play are 722), the player may experience a win as indicated by the second win indicator 732*b*—e.g., the second win amount data of six hundred (600) credits, bringing the players credit balance back up to the second credit balance of one thousand (1,000) credits, output by the second credit balance indicator 726*b*. In the example depicted by FIG. 7B, the second bet buttons 728*b*-1, 728*b*-2, 728*b*-3, 728*b*-4 are provided as modified versions (or replacements for) the first bet buttons 728*a*-1, 728*a*-2, 728*a*-3, 728*a*-4 and/or the second wager amounts may replace and/or modify the first wager amounts.

In some embodiments, the second bet buttons 728*b*-1, 728*b*-2, 728*b*-3, 728*b*-4 and/or the respectively associated second wager amounts may be based on one or more of the player's winning outcome or result (e.g., the second win amount data) and the player's updated credit balance (e.g., the second credit balance). As shown for ease of illustration and in accordance with some embodiments, for example, as the player's credit balance has doubled (from five hundred (500) credits to one thousand (1,000) credits), so may the available wager amounts/sizes. In such a manner, for example, while the player could risk up to twenty percent (20%; first total bet amount of one hundred (100) credits divided by the first credit balance of five hundred (500) credits) of the first credit balance based on the first available max bet in FIG. 7A, the second bet buttons 728*b*-1, 728*b*-2, 728*b*-3, 728*b*-4 and/or the respectively associated second wager amounts are updated based on the second credit balance such that the player may still be able to risk up to twenty percent (20%; second total bet amount of two hundred (200) credits divided by the second credit balance of one thousand (1,000) credits) of the second credit balance. According to some embodiments, the second bet buttons 728*b*-1, 728*b*-2, 728*b*-3, 728*b*-4 and/or the respectively associated second wager amounts may be defined based on the second win amount data. The max bet and/or other associated wager size options may, for example, be set to permit the player to risk up to (or precisely) one-third (⅓ or thirty-three percent (33%); second win amount of six hundred (600) credits divided by three (3)) of the second win amount. As described herein, other player-associated variable may also or alternatively be utilized to set, define, updated, modify, and/or determine wager size options provided to the player. In some embodiments, the determining of the wager size options may be specifically set to take into account multiple player-associated variables. In such a manner, for example, even players playing the same game and having the same credit balances (or wins) may be presented with different wager size options—e.g., based on differing characteristics of the players such as player location, skill, rating, demographics, etc.

While various components of the example interfaces 720*a*-*b* have been depicted with respect to certain labels, layouts, headings, titles, graphics, and/or configurations, these features have been presented for reference and example only. Other labels, layouts, headings, titles, and/or configurations may be implemented without deviating from the scope of embodiments herein. Similarly, while a certain number of tabs, information screens, form fields, buttons, and/or data entry options have been presented, variations thereof may be practiced in accordance with some embodiments. Similarly, while "credits" are utilized as example balance and/or account level indicators for ease of reference herein, it should be understood that other monetary and/or value indicators such as dollars ($), euros (€), or pounds sterling (£) may also or alternatively be utilized in accordance with some embodiments.

VI. Apparatus and Article of Manufacture

Figure 8:
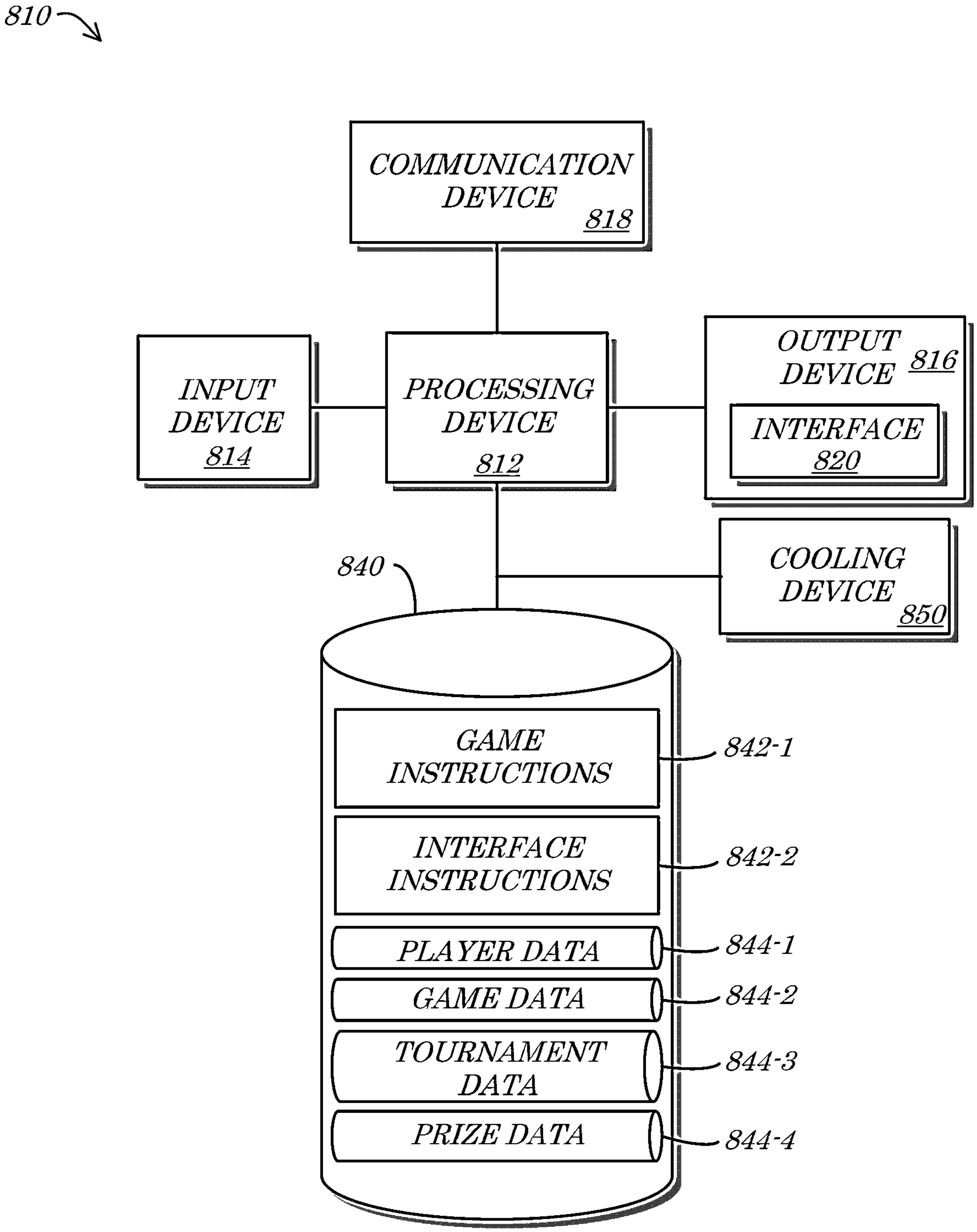
FIG. 8 is a block diagram of an apparatus according to some embodiments.
Figure 9A:
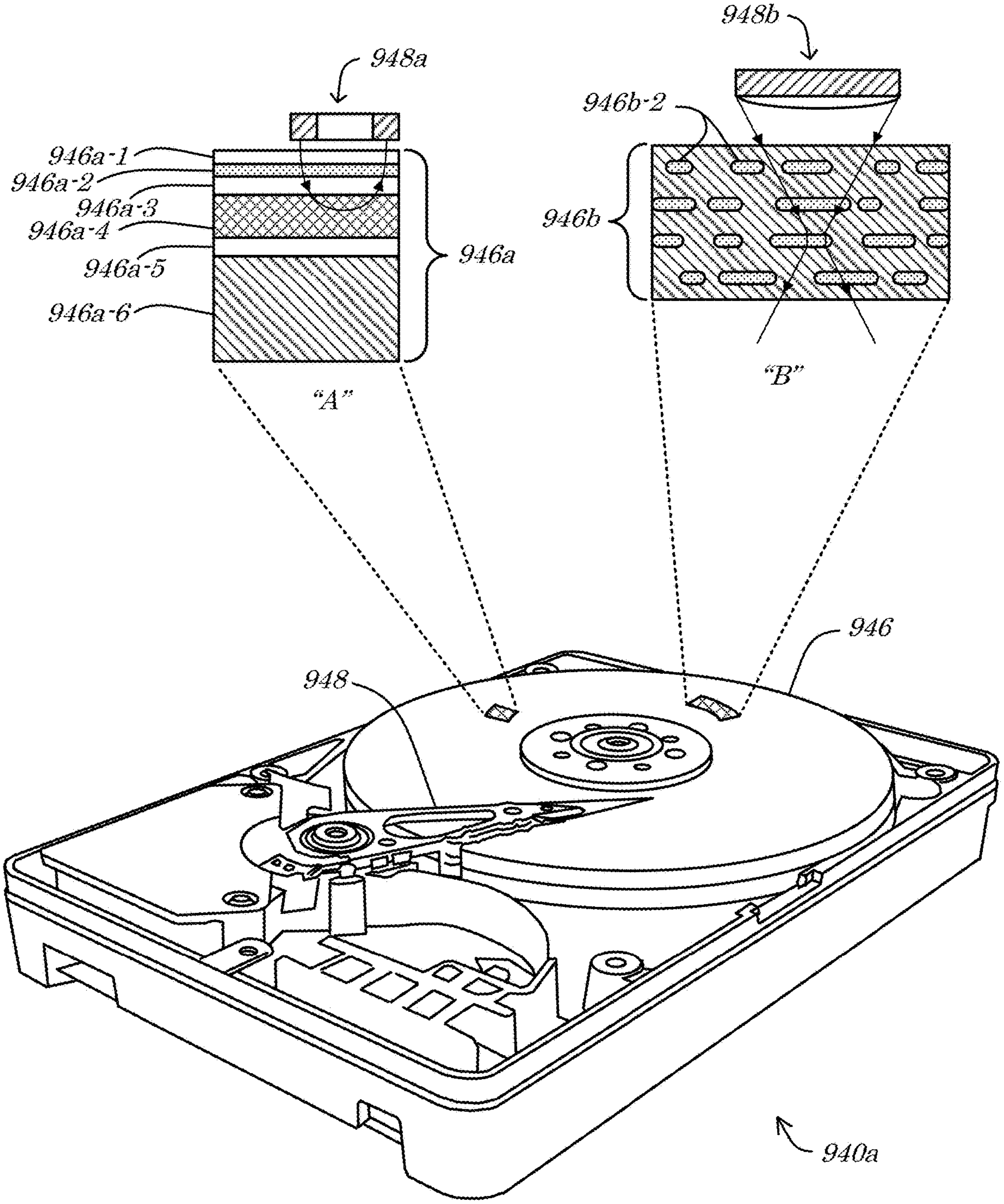
FIG. 9A, FIG. 9B, FIG. 9C, FIG. 9D, and FIG. 9E are perspective diagrams of exemplary data storage devices according to some embodiments.
Figure 9B:
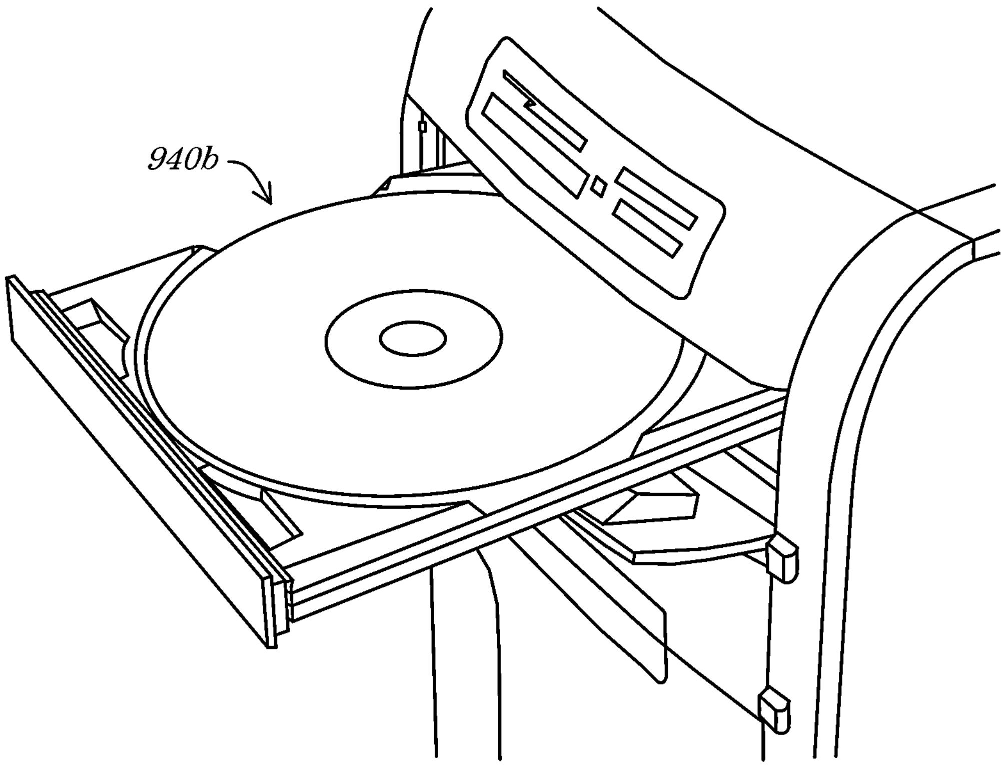
Figure 9C:
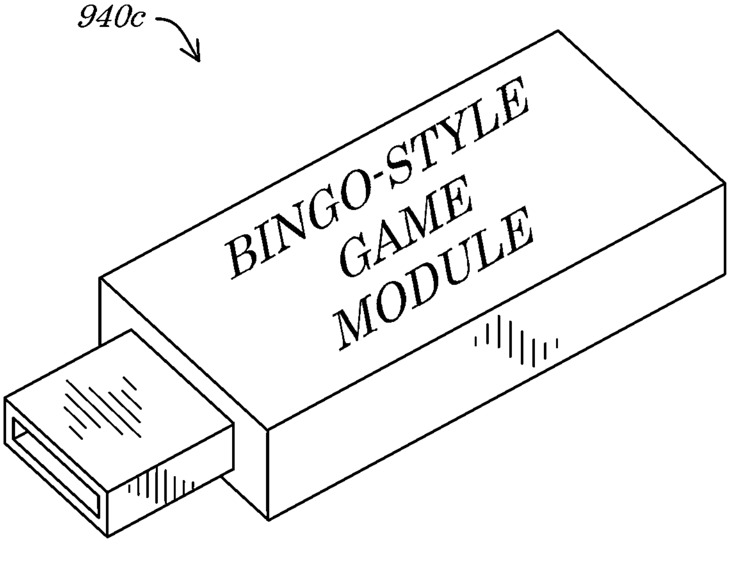
Figure 9D:
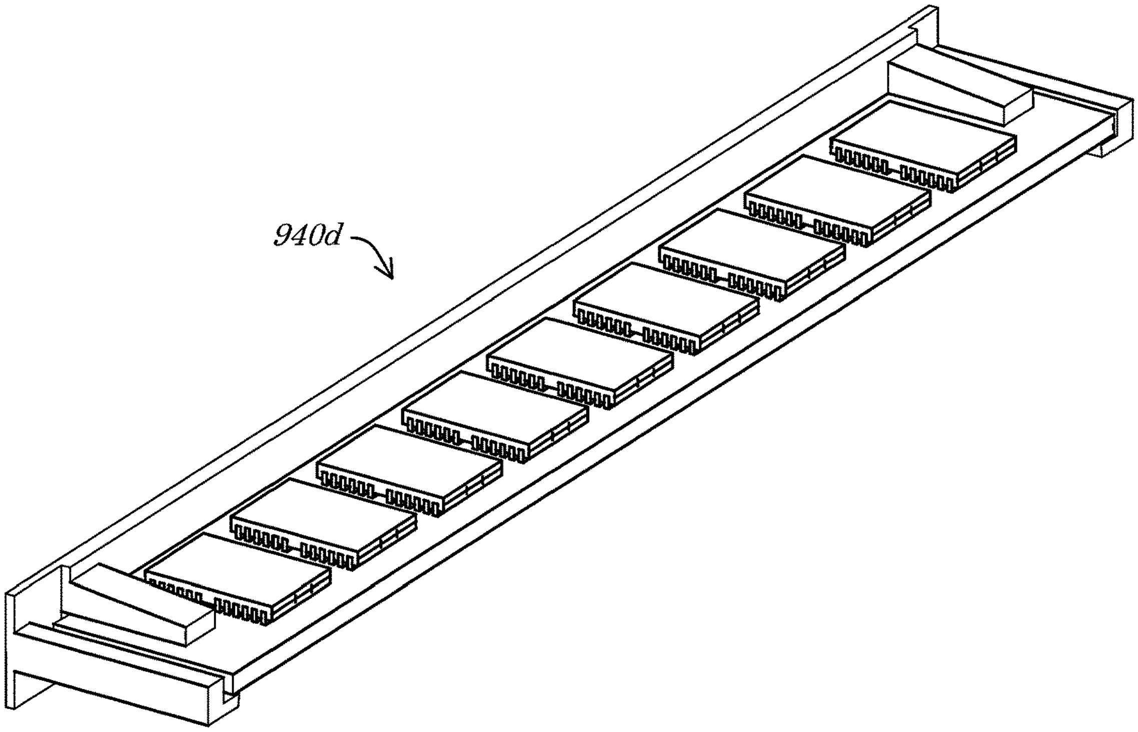
Figure 9E:
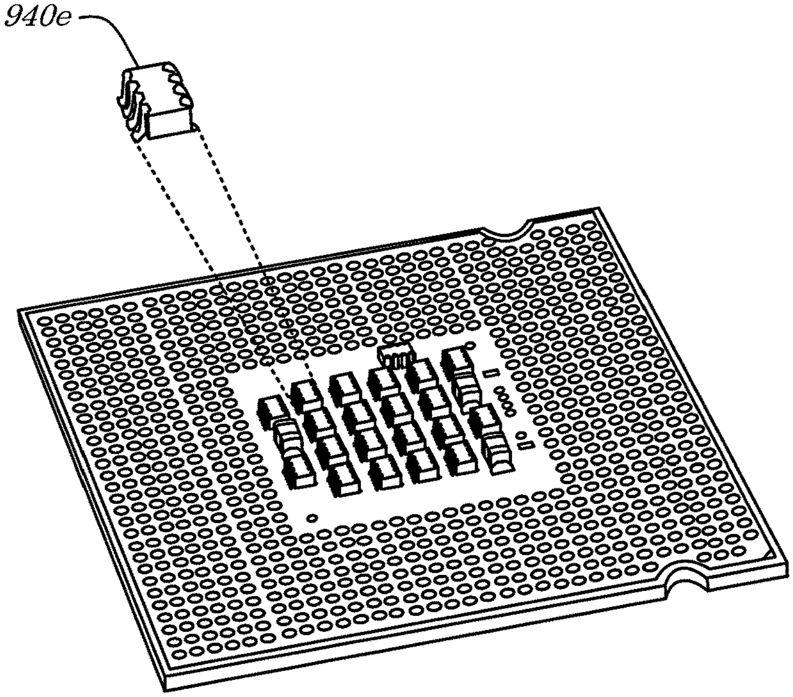

Turning to FIG. 8, a block diagram of an apparatus 810 according to some embodiments is shown. In some embodiments, the apparatus 810 may be similar in configuration and/or functionality to any of the player and/or user devices 102*a-n*, 202*a-n*, 302*a-b*, 402, 502 and/or the servers and/or controller devices 110, 210*a-n*, 310*a-g*, 410*e-f*, 510*a-j* of FIG. 1, FIG. 2, FIG. 3, FIG. 4, and/or FIG. 5 herein, and/or may otherwise comprise a portion of the systems 100, 200, 300, 400, 500 of FIG. 1, FIG. 2, FIG. 3, FIG. 4, and/or FIG. 5 herein. The apparatus 810 may, for example, execute, process, facilitate, and/or otherwise be associated with the method 600 of FIG. 6 herein, and/or one or more portions thereof. In some embodiments, the apparatus 810 may comprise a processing device 812, an input device 814, an output device 816, a communication device 818, an interface 820, a memory device 840 (storing various programs and/or instructions 842 and data 844), and/or a cooling device 850. According to some embodiments, any or all of the components 812, 814, 816, 818, 820, 840, 842, 844, 850 of the apparatus 810 may be similar in configuration and/or functionality to any similarly named and/or numbered components described herein. Fewer or more components 812, 814, 816, 818, 820, 840, 842, 844, 850 and/or various configurations of the components 812, 814, 816, 818, 820, 840, 842, 844, 850 be included in the apparatus 810 without deviating from the scope of embodiments described herein.

According to some embodiments, the processing device 812 may be or include any type, quantity, and/or configuration of electronic and/or computerized processor that is or becomes known. The processing device 812 may comprise, for example, an Intel® IXP 2800 network processor or an Intel® XEON™ Processor coupled with an Intel® E7501 chipset. In some embodiments, the processing device 812 may comprise multiple inter-connected processors, microprocessors, and/or micro-engines. According to some embodiments, the processing device 812 (and/or the apparatus 810 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 810 comprises a server such as a blade server, necessary power may be supplied via a standard AC outlet, power strip, surge protector, a PDU, and/or Uninterruptible Power Supply (UPS) device.

In some embodiments, the input device 814 and/or the output device 816 are communicatively coupled to the processing device 812 (e.g., via wired and/or wireless connections and/or pathways) and they may generally comprise any types or configurations of input and output components and/or devices that are or become known, respectively. The input device 814 may comprise, for example, a keyboard that allows an operator of the apparatus 810 to interface with the apparatus 810 (e.g., by a player, such as to participate in a game comprising dynamic wager sizes, as described herein). In some embodiments, the input device 814 may comprise a sensor configured to provide information such as player input to the apparatus 810 and/or the processing device 812. The output device 816 may, according to some embodiments, comprise a display screen and/or other practicable output component and/or device. The output device 816 may, for example, provide the interface 820 to a player (e.g., via a website and/or electronic communications network device). According to some embodiments, the input device 814 and/or the output device 816 may comprise and/or be embodied in a single device such as a touch-screen monitor (e.g., a device capable of both receiving input and providing output).

In some embodiments, the communication device 818 may comprise any type or configuration of communication device that is or becomes known or practicable. The communication device 818 may, for example, comprise a network interface card (NIC), a telephonic device, a cellular network device, a router, a hub, a modem, and/or a communications port or cable. In some embodiments, the communication device 818 may be coupled to provide data to a player device (not shown in FIG. 8), such as in the case that the apparatus 810 is utilized to provide the interface 820 to a player as described herein. The communication device 818 may, for example, comprise a cellular telephone network transmission device that sends signals indicative of game interface components to customer and/or subscriber handheld, mobile, and/or telephone device. According to some embodiments, the communication device 818 may also or alternatively be coupled to the processing device 812. In some embodiments, the communication device 818 may comprise an IR, RF, Bluetooth™, NFC, and/or Wi-Fi® network device coupled to facilitate communications between the processing device 812 and another device (such as a player device and/or a third-party device).

The memory device 840 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 840 may, according to some embodiments, store one or more of game instructions 842-1 and/or interface instructions 842-2. In some embodiments, the game instructions 842-1 and/or the interface instructions 842-2 may be utilized by the processing device 812 to provide output information via the output device 816 and/or the communication device 818.

According to some embodiments, the game instructions 842-1 may be operable to cause the processing device 812 to process player data 844-1, game data 844-2, tournament data 844-3, and/or prize data 844-4. Player data 844-1, game data 844-2, tournament data 844-3, and/or prize data 844-4 received via the input device 814 and/or the communication device 818 may, for example, be analyzed, sorted, filtered, decoded, decompressed, ranked, scored, plotted, and/or otherwise processed by the processing device 812 in accordance with the game instructions 842-1. In some embodiments, player data 844-1, game data 844-2, tournament data 844-3, and/or prize data 844-4 may be fed by the processing device 812 through one or more mathematical and/or statistical formulas and/or models in accordance with the game instructions 842-1 to provide games comprising dynamic wager sizes in accordance with embodiments described herein.

In some embodiments, the interface instructions 842-2 may be operable to cause the processing device 812 to process player data 844-1, game data 844-2, tournament data 844-3, and/or prize data 844-4. Player data 844-1, game data 844-2, tournament data 844-3, and/or prize data 844-4 received via the input device 814 and/or the communication device 818 may, for example, be analyzed, sorted, filtered, decoded, decompressed, ranked, scored, plotted, and/or otherwise processed by the processing device 812 in accordance with the interface instructions 842-2. In some embodiments, player data 844-1, game data 844-2, tournament data 844-3, and/or prize data 844-4 may be fed by the processing device 812 through one or more mathematical and/or statistical formulas and/or models in accordance with the interface instructions 842-2 to provide the interface 820 which may comprise, for example, one or more game interfaces configured to (e.g., specially-programmed to) provide wagering and/or wagering-style games comprising dynamic wager sizes in accordance with embodiments described herein.

Any or all of the exemplary instructions and data types described herein and other practicable types of data may be stored in any number, type, and/or configuration of memory devices that is or becomes known. The memory device 840 may, for example, comprise one or more data tables or files, databases, table spaces, registers, and/or other storage structures. In some embodiments, multiple databases and/or storage structures (and/or multiple memory devices 840) may be utilized to store information associated with the apparatus 810. According to some embodiments, the memory device 840 may be incorporated into and/or otherwise coupled to the apparatus 810 (e.g., as shown) or may simply be accessible to the apparatus 810 (e.g., externally located and/or situated).

In some embodiments, the apparatus 810 may comprise the cooling device 850. According to some embodiments, the cooling device 850 may be coupled (physically, thermally, and/or electrically) to the processing device 812 and/or to the memory device 840. The cooling device 850 may, for example, comprise a fan, heat sink, heat pipe, radiator, cold plate, and/or other cooling component or device or combinations thereof, configured to remove heat from portions or components of the apparatus 810.

Referring now to FIG. 9A, FIG. 9B, FIG. 9C, FIG. 9D, and FIG. 9E, perspective diagrams of exemplary data storage devices 940*a-e* according to some embodiments are shown. The data storage devices 940*a-e* may, for example, be utilized to store instructions and/or data such as the game instructions 842-1, interface instructions 842-2, player data 844-1, game data 844-2, tournament data 844-3, and/or prize data 844-4, each of which is described in reference to FIG. 8 herein. In some embodiments, instructions stored on the data storage devices 940*a-e* may, when executed by a processor, cause the implementation of and/or facilitate the method 600 of FIG. 6 and/or portions thereof described herein.

According to some embodiments, the first data storage device 940*a* may comprise one or more various types of internal and/or external hard drives. The first data storage device 940*a* may, for example, comprise a data storage medium 946 that is read, interrogated, and/or otherwise communicatively coupled to and/or via a disk reading device 948. In some embodiments, the first data storage device 940*a* and/or the data storage medium 946 may be configured to store information utilizing one or more magnetic, inductive, and/or optical means (e.g., magnetic, inductive, and/or optical-encoding). The data storage medium 946, depicted as a first data storage medium 946*a* for example (e.g., breakout cross-section "A"), may comprise one or more of a polymer layer 946*a*-1, a magnetic data storage layer 946*a*-2, a non-magnetic layer 946*a*-3, a magnetic base layer 946*a*-4, a contact layer 946*a*-5, and/or a substrate layer 946*a*-6. According to some embodiments, a magnetic read head 946*a* may be coupled and/or disposed to read data from the magnetic data storage layer 946*a*-2.

In some embodiments, the data storage medium 946, depicted as a second data storage medium 946*b* for example (e.g., breakout cross-section "B"), may comprise a plurality of data points 946*b*-2 disposed with the second data storage medium 946*b*. The data points 946*b*-2 may, in some embodiments, be read and/or otherwise interfaced with via a laser-enabled read head 948*b* disposed and/or coupled to direct a laser beam through the second data storage medium 946*b*.

In some embodiments, the second data storage device 940*b* may comprise a CD, CD-ROM, DVD, Blu-Ray™ Disc, and/or other type of optically-encoded disk and/or other storage medium that is or becomes known or practicable. In some embodiments, the third data storage device 940*c* may comprise a USB keyfob, dongle, and/or other type of flash memory data storage device that is or becomes know or practicable. In some embodiments, the fourth data storage device 940*d* may comprise RAM of any type, quantity, and/or configuration that is or becomes practicable and/or desirable. In some embodiments, the fourth data storage device 940*d* may comprise an off-chip cache such as a Level 2 (L2) cache memory device. According to some embodiments, the fifth data storage device 940*e* may comprise an on-chip memory device such as a Level 1 (L1) cache memory device.

The data storage devices 940*a-e* may generally store program instructions, code, and/or modules that, when executed by a processing device cause a particular machine to function in accordance with one or more embodiments described herein. The data storage devices 940*a-e* depicted in FIG. 9A, FIG. 9B, FIG. 9C, FIG. 9D, and FIG. 9E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an game provider may, for example, comprise various specialized computers that interact to provide for bingo-style games as described herein.

VII. Rules of Interpretation

Numerous embodiments are described in this patent application, and are presented for illustrative purposes only. The described embodiments are not, and are not intended to be, limiting. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments. It is contemplated, however, that while some embodiment are not limited by the examples provided herein, some embodiments may be specifically bounded or limited by provided examples, structures, method steps, and/or sequences. Embodiments having scopes limited by provided examples may also specifically exclude features not explicitly described or contemplated.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, any reference to an "alternate", "alternative", and/or "alternate embodiment" is intended to connote one or more possible variations—not mutual exclusivity. In other words, it is expressly contemplated that "alternatives" described herein may be utilized and/or implemented together, unless they inherently are incapable of being utilized together.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including the specification, its claims and figures, and anything which may be incorporated by reference, unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". In some embodiments, a first thing being "based on" a second thing refers specifically to the first thing taking into account the second thing in an explicit manner. In such embodiments, for example, a processing step based on the local weather, which itself is in some manner based on or affected by (for example) human activity in the rainforests, is not "based on" such human activities because it is not those activities that being explicitly analyzed, included, taken into account, and/or processed.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "wherein", as utilized herein, does not evidence intended use. The term "wherein" expressly refers to one or more features inclusive in a particular embodiment and does not imply or include an optional or conditional limitation.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to allow for distinguishing that particular referenced feature from another feature that is described by the same term or by a similar term. For example, a "first widget" may be so named merely to allow for distinguishing it in one or more claims from a "second widget", so as to encompass embodiments in which (1) the "first widget" is or is the same as the "second widget" and (2) the "first widget" is different than or is not identical to the "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein. According to some embodiments, a "processor" may primarily comprise and/or be limited to a specific class of processors referred to herein as "processing devices". "Processing devices" are a subset of processors limited to physical devices such as CPU devices, Printed Circuit Board (PCB) devices, transistors, capacitors, logic gates, etc. "Processing devices", for example, explicitly exclude biological, software-only, and/or biological or software-centric physical devices. While processing devices may include some degree of soft logic and/or programming, for example, such devices must include a predominant degree of physical structure in accordance with 35 U.S.C. § 101.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method for offering dynamic wagering size options in an online slot-style wagering game, comprising:

initiating, by a processing device, an online gaming session of a slot-style wagering game, wherein the slot-style wagering game comprises an interface generated with a plurality of first bet buttons, the plurality of first bet buttons representing a first set of wager amounts;

determining, by the processing device, an amount of funds available to a player of the slot-style wagering game;

setting, by the processing device and based on the amount of funds available to the player of the slot-style wagering game, the first set of wager amounts;

providing, by the processing device and to the player of the slot-style wagering game, and via the first bet buttons of the interface, an indication of the first set of wager amounts;

receiving, by the processing device, an indication that the player of the slot-style wagering game has selected a first one of the first bet buttons corresponding to a first wager amount of the first set of wager amounts;

executing, by the processing device and as part of the online gaming session of the slot-style wagering game, a first play of the slot-style wagering game by the player in accordance with the first wager amount of the first set of wager amounts;

determining, by the processing device and after the first play of the slot-style wagering game, an updated amount of funds available to the player of the slot-style wagering game;

setting, by the processing device and based on the updated amount of funds available to the player of the slot-style wagering game, a second set of wager amounts that differs from the first set of wager amounts;

providing, by the processing device and to the player of the slot-style wagering game, and via a second bet buttons of the interface, an indication of the second set of wager amounts;

receiving, by the processing device, an indication that the player of the slot-style wagering game has selected a second one of the second bet buttons corresponding to a second wager amount of the second set of wager amounts; and executing, by the processing device and as part of the online gaming session of the slot-style wagering game, a second play of the slot-style wagering game by the player in accordance with the second wager amount of the second set of wager amounts.

2. The method of claim 1, wherein the determining of the funds available to the player of the wagering game, comprises:

determining an amount of funds deposited by the player.

3. The method of claim 1, wherein the determining of the funds available to the player of the wagering game, comprises:

determining an amount of funds allocated to the wagering game by the player.

4. The method of claim 1, wherein the determining of the funds available to the player of the wagering game, comprises:

determining a credit balance of the player in the wagering game.

5. The method of claim 1, wherein the determining of the funds available to the player of the wagering game, comprises:

determining an amount won by the player in the wagering game.

6. A system for providing an online slot-style wagering game having a fixed number of betting options that correspond to wagering values that dynamically change during game play based on a changing amount of funds available to a player of the slot-style wagering game, comprising:

a processing device; and a non-transitory computer-readable medium in communication with the processing device, the non-transitory computer-readable medium storing instructions that when executed by the processing device result in:

initiating an online gaming session of the slot-style wagering game, wherein the slot-style wagering game comprises an interface generated with a fixed number of wagering buttons, each of the wagering buttons corresponding to a particular wager amount;

identifying an initial amount of funds available to the player of the slot-style wagering game;

setting, based on the initial amount of funds available to the player of the slot-style wagering game, initial values for each of the particular wager amounts;

providing, to the player of the slot-style wagering game, and via fixed number of wagering buttons of the interface, an indication of the initial values for each of the particular wager amounts;

receiving an indication that the player of the slot-style wagering game has selected a first one of the wagering buttons corresponding to a first initial wager amount;

executing, as part of an online gaming session of the slot-style wagering game, a first play of the slot-style wagering game by the player in accordance with the first initial wager amount;

identifying, after the first play of the slot-style wagering game, an updated amount of funds available to the player of the slot-style wagering game;

setting, based on the updated amount of funds available to the player of the slot-style wagering game, updated values for each of the particular wager amounts, wherein at least one of the updated values differs from a corresponding initial value;

providing, to the player of the slot-style wagering game and via the fixed number of wagering buttons, an indication of the updated values for each of the particular wager amounts;

receiving an indication that the player of the slot-style wagering game has selected a second one of the wagering buttons corresponding to a second updated wager amount; and executing, as part of the online gaming session of the slot-style wagering game, a second play of the slot-style wagering game by the player in accordance with the second updated wager amount.

* * * * *